United States Patent
Shimakawa

(10) Patent No.: US 10,943,383 B2
(45) Date of Patent: Mar. 9, 2021

(54) INFORMATION PROCESSING APPARATUS AND INFORMATION PROCESSING METHOD

(71) Applicant: SONY CORPORATION, Tokyo (JP)

(72) Inventor: Masato Shimakawa, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/478,235

(22) PCT Filed: Jan. 11, 2018

(86) PCT No.: PCT/JP2018/000426
§ 371 (c)(1),
(2) Date: Jul. 16, 2019

(87) PCT Pub. No.: WO2018/139203
PCT Pub. Date: Aug. 2, 2018

(65) Prior Publication Data
US 2019/0362530 A1 Nov. 28, 2019

(30) Foreign Application Priority Data

Jan. 26, 2017 (JP) .............................. JP2017-012308

(51) Int. Cl.
*G06T 13/40* (2011.01)
*G06T 7/70* (2017.01)

(52) U.S. Cl.
CPC ................ *G06T 13/40* (2013.01); *G06T 7/70* (2017.01)

(58) Field of Classification Search
None
See application file for complete search history.

(56) References Cited

U.S. PATENT DOCUMENTS

| 2011/0099476 A1 | 4/2011 | Snook et al. |
| 2011/0298827 A1 | 12/2011 | Perez |
| 2012/0299912 A1* | 11/2012 | Kapur ................... G06F 3/017 345/419 |

(Continued)

FOREIGN PATENT DOCUMENTS

| CN | 102741885 A | 10/2012 |
| CN | 102918489 A | 2/2013 |
| CN | 102981603 A | 3/2013 |

(Continued)

OTHER PUBLICATIONS

International Search Report and Written Opinion of PCT Application No. PCT/JP2018/000426, dated Mar. 6, 2018, 09 pages of ISRWO.

*Primary Examiner* — Nicholas R Wilson
(74) *Attorney, Agent, or Firm* — Chip Law Group

(57) ABSTRACT

An information processing apparatus according to an aspect of the present technology includes an acquisition unit, a generation unit, and a generation control unit. The acquisition unit acquires an image of a target object. The generation unit is able to execute each of a first generation process and a second generation process different from the first generation process as a generation process of generating a model of the target object on the basis of the acquired image of the target object. The generation control unit controls switching of execution of the first generation process and execution of the second generation process by the generation unit.

20 Claims, 26 Drawing Sheets

(56) References Cited

U.S. PATENT DOCUMENTS

2012/0306918 A1    12/2012  Suzuki et al.
2013/0113829 A1*    5/2013  Suzuki .................... G06T 13/40
                                                        345/633

FOREIGN PATENT DOCUMENTS

| EP | 2491535 A2 | 8/2012 |
| EP | 2577441 A2 | 4/2013 |
| JP | 2006-217161 A | 8/2006 |
| JP | 2012-252437 A | 12/2012 |
| JP | 2013-508866 A | 3/2013 |
| JP | 2013-533537 A | 8/2013 |
| JP | 2014-149836 A | 8/2014 |
| KR | 10-2012-0099017 A | 9/2012 |
| WO | 2011/050219 A2 | 4/2011 |
| WO | 2011/153078 A2 | 12/2011 |

* cited by examiner

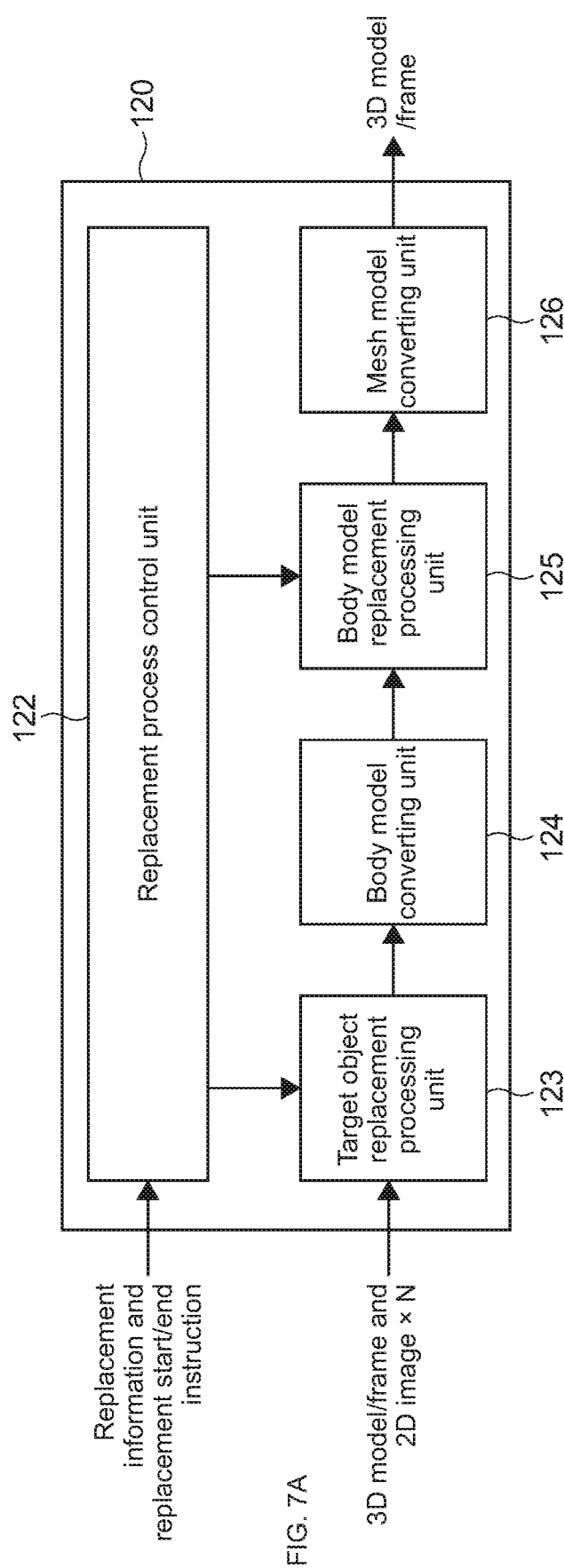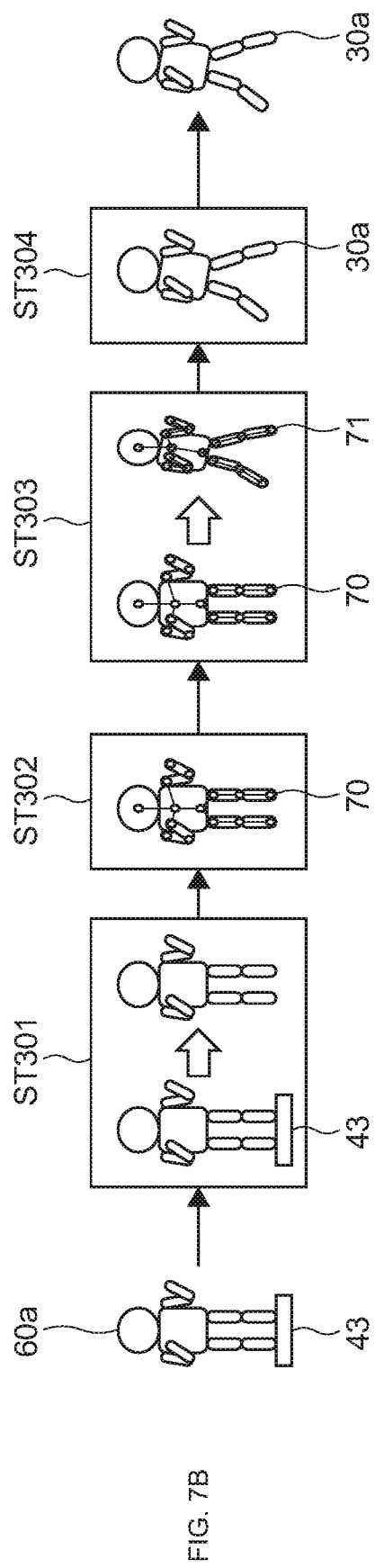

| Status | | Replacement condition information | Replacement target information | Model generation information |
|---|---|---|---|---|
| Model | 2D image recognition | — | | |
| | 3D model recognition | — | | |
| UI determination | Voice recognition | — | | |
| | Gesture recognition | Gesture recognition in progress | | |

FIG.12

| UI event example |
|---|
| Gesture recognition start |
| Gesture recognition in progress |
| Gesture recognition end |
| Gesture recognition result 「xxx」 |
| Voice recognition start |
| Voice recognition in progress |
| Voice recognition end |
| Voice recognition result 「xxx」 |
| Multimodal recognition result 「xxx」 |

| Replacement condition information | | Replacement target information | Model generation information |
|---|---|---|---|
| Status | HMD: HMD is in use | | |
| Model | 2D image recognition | HMD feature quantity information | |
| | 3D model recognition | — | |
| UI determination | Voice recognition | — | |
| | Gesture recognition | — | |

| Status | | Replacement condition information | Replacement target information | Model generation information |
|---|---|---|---|---|
| Model | 2D image recognition | — | | |
| | 3D model recognition | — | | |
| | Privacy detection | Privacy image detection in progress | | |
| UI determination | Voice recognition | — | | |
| | Gesture recognition | — | | |

| Status | | Replacement condition information | Replacement target information | Model generation information |
|---|---|---|---|---|
| | | 161 | 163 | 164 |
| Model | 2D image recognition | — | | |
| | 3D model recognition | — | | |
| | Privacy detection | Privacy image candidate detection in progress | | |
| UI determination | Voice recognition | — | | |
| | Gesture recognition | Gesture recognition result "privacy" | | |

| Status | | Replacement condition information | Replacement target information | Model generation information |
|---|---|---|---|---|
| | | 161 | 163 | 164 |
| Model | 2D image recognition | — | | |
| | 3D model recognition | — | | |
| | Privacy detection | Privacy image candidate detection in progress | | |
| UI determination | Voice recognition | Voice recognition result "privacy" | | |
| | Gesture recognition | — | | |

162

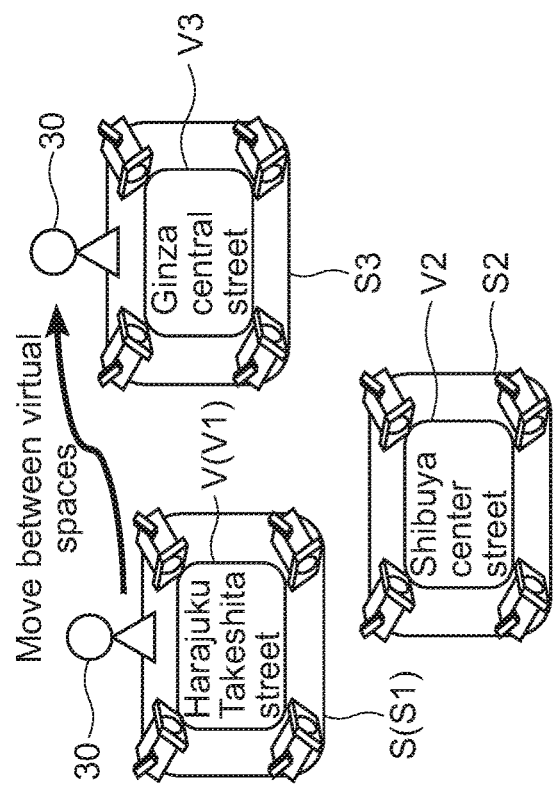
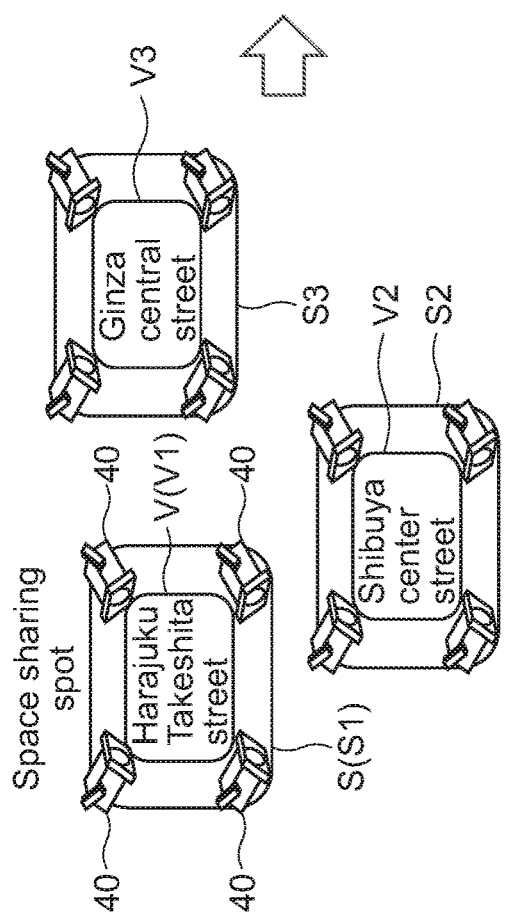
FIG.25

FIG. 27A

| Replacement condition information | | Replacement target information | Model generation information |
|---|---|---|---|
| Status | Walking in progress | 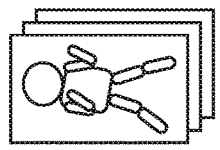 | |
| Model | 2D image recognition | Walking controller: walking in progress | |
| | 3D model recognition | Walking controller feature quantity information | |
| UI determination | Voice recognition | — | |
| | Gesture recognition | — | |

FIG. 27B

| Replacement condition information | | Replacement target information | Model generation information |
|---|---|---|---|
| Status | Virtual space movement in progress | 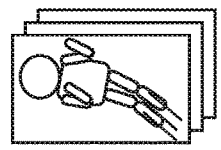 | |
| Model | 2D image recognition | Walking controller: jump | |
| | 3D model recognition | Walking controller feature quantity information | |
| UI determination | Voice recognition | Voice recognition result "to Ginza central street" | |
| | Gesture recognition | — | |

…

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/000426 filed on Jan. 11, 2018, which claims priority benefit of Japanese Patent Application No. JP 2017-012308 filed in the Japan Patent Office on Jan. 26, 2017. Each of the above-referenced applications is hereby incorporated herein by reference in its entirety.

TECHNICAL FIELD

The present technology relates to an information processing apparatus, an information processing method, and a program which are capable of generating a model displayed in a virtual space or the like.

BACKGROUND ART

In recent years, the technology which provides various virtual experiences to users via a virtual space constructed by a computer system or the like has been known. For example, a character or the like selected by the user is displayed in the virtual space. The user can move in the virtual space or communicate with other users by operating the characters or the like.

For example, an operation representation of the character in the virtual space using a controller is disclosed in Patent Literature 1. In Patent Literature 1, an activity of the controller such as a change in a position of the controller acquired by the user or a button operation is detected. A posture, a motion, and an expression of the character in the virtual space are expressed on the basis of the detected activity of the controller. Accordingly, it is possible to communicate smoothly, for example, with gestures (Paragraphs [0001], [0008], [0033], and the like in Specification of Patent Literature 1).

CITATION LIST

Patent Literature

Patent Literature 1: JP-A-2014-149836

SUMMARY OF INVENTION

Technical Problem

As described above, there is a need for a technology capable of controlling an expression of a character or the like in a virtual space in accordance with an operation of the user or the like and thus providing a natural virtual experience.

The present technology was made in light of the foregoing, and it is an object of the present technology to provide an information processing apparatus, an information processing method, and a program which are capable of providing the user with a natural virtual experience.

Solution to Problem

In order to achieve the above object, an information processing apparatus according to an aspect of the present technology includes an acquisition unit, a generation unit, and a generation control unit.

The acquisition unit acquires an image of a target object.

The generation unit executes each of a first generation process and a second generation process different from the first generation process as a generation process of generating a model of the target object on the basis of the acquired image of the target object.

The generation control unit controls switching of execution of the first generation process and execution of the second generation process by the generation unit.

In the information processing apparatus, the first and second generation processes different from each other can be executed as the generation process for generating the model of the target object on the basis of the image of the target object. It is possible to provide the user with the natural virtual experience by appropriately switching the executions of the first and second generation processes.

The first generation process may generate a first model in which the target object is reproduced with first reproducibility. In this case, the second generation process may generate a second model in which the target object is reproduced with second reproducibility lower than the first reproducibility.

Accordingly, it is possible to use the first model with high reproducibility and the second model with low reproducibility in different manners. Accordingly, it is possible to provide a more natural virtual experience to the user.

The first generation process may generate the first model in which a status of the target object included in an image of the target object is reproduced. The second generation process may generate the second model in which at least some of statuses of the target object included in the image of the target object are changed.

Accordingly, for example, it is possible to generate each of the first model in which the status of the target object is reproduced without change and the second model in which a desired status is expressed by changing some of the statuses of the target object.

The second generation process may generate the second model in which at least a part of the target object is replaced or deleted.

Accordingly, it is possible to easily change the status of the target object. As a result, a processing time or the like can be reduced, and high performance can be realized.

The target object may include a person and an object used by the person.

Accordingly, it is possible, for example, to generate a model imitating the status of the user and provide a natural virtual experience to the user.

The second generation process may generate the second model in which at least one status of an expression, a posture, and a motion of the person is changed.

Accordingly, it is possible to express various statuses of the user.

The second generation process may generate the second model in which the object used by the person is replaced or deleted.

Accordingly, for example, it is possible to generate a model in which the controller or the like used by the user is deleted, and it is possible to provide a more natural virtual experience.

The generation unit may generate the first and second models in which transition statuses for switching to the first and second models are respectively expressed when the switching of the executions of the first and second generation processes is performed.

Accordingly, switching to each of the first and second models is expressed smoothly.

The generation control unit may control the switching of the execution of the first generation process and the execution of the second generation by the generation unit on the basis of determination information including a determination condition of whether or not at least some of the statuses of the target object are changed.

Accordingly, it is possible to switch the first and second generation processes with a high degree of accuracy.

The determination condition may include a condition regarding at least one of an output from a controller used by the person, an image of the person, or a voice of the person.

Accordingly, it is possible to perform determination corresponding to various situations and to switch the first and second generation processes appropriately.

The generation control unit may select the execution of the second generation process in a case in which an instruction of a predetermined motion is input. In this case, the generation unit may generate the second model that performs the predetermined motion as the second generation process.

Accordingly, it is possible to express a motion designated by the user with a high degree of accuracy using the second model.

The generation unit may generate the second model that executes a motion of transitioning to the predetermined motion as the second generation process.

Accordingly, it is possible to express a form of smoothly transitioning to a predetermined motion.

The determination condition may include a condition regarding at least one of an operation input by a gesture of the person or an operation input by a voice.

Accordingly, it is possible to determine whether or not a gesture, a speech, or the like for the operation input is being performed, and it is possible to switch the gesture or the like to other expressions.

The generation control unit may select the execution of the second generation process in a case in which the operation input by the gesture and the operation input by the voice are received. In this case, the generation unit may generate the second model that does not execute the gesture and a speaking motion of the voice as the second generation process.

Accordingly, it is possible to generate the second model in which motions such as a gesture, a speech, and the like for operation input are not reproduced. Accordingly, it is possible to cut the motion of the operation input or the like.

The determination condition may include a condition of whether or not the person is in a status in which privacy protection is required.

Accordingly, it is possible to determine a case in which the protection of the privacy of the user is required and to perform switching to an expression in which the privacy is protected.

The generation control unit may select the execution of the second generation process in a case in which it is determined that the person is in the status in which privacy protection is required. In this case, the generation unit may generate the second model in which at least a part of the person is changed as the second generation process.

Accordingly, it is possible to generate the second model in which the privacy of the user is protected and enjoy the virtual experience with security.

The determination information may include a method of changing at least some of the statuses of the target object associated with the determination condition. In this case, the generation unit may execute the second generation process on the basis of the determination information.

Accordingly, it is possible to generate the second model corresponding to more various situations with a high degree of accuracy, and it is possible to realize a status desired by the user with a high degree of accuracy.

The determination information may include specifying information specifying a part which is a change target of the target object and a method of changing the specified part which is the change target.

Accordingly, it is possible to generate the second model with a high degree of accuracy, and it is possible to realize a status desired by the user with a high degree of accuracy.

An information processing method according to an aspect of the present technology is an information processing method performed by a computer system and includes acquiring an image of a target object.

Each of a first generation process and a second generation process different from the first generation process is executed as a generation process of generating a model of the target object on the basis of the acquired image of the target object.

The switching of the execution of the first generation process and the execution of the second generation process is controlled.

A program according to an aspect of the present technology causes a computer system to execute the following steps:

a step of acquiring an image of a target object;

a step of executing each of a first generation process and a second generation process different from the first generation process as a generation process of generating a model of the target object on the basis of the acquired image of the target object; and a step of controlling switching of execution of the first generation process and execution of the second generation process.

Advantageous Effects of Invention

As described above, according to the present technology, it is possible to provide the user with a more natural virtual experience. Note that the effects described herein are not necessarily limited, and any of effects described in the present disclosure may be included.

BRIEF DESCRIPTION OF DRAWINGS

FIGS. 7A and 7B are schematic diagrams for describing an example of an operation of a replacement processing unit.

FIG. 12 is a schematic diagram illustrating an example of replacement information referred to in an example illustrated in FIG. 11.

FIG. 18 is a schematic diagram illustrating an example of replacement information referred to in an example illustrated in FIG. 17.

FIG. 21 is a schematic diagram illustrating an example of replacement information referred to in an example illustrated in FIG. 20.

FIGS. 22A and 22B are schematic diagrams illustrating another example of replacement information referred to in an example illustrated in FIG. 20.

FIG. 25 is a schematic diagram illustrating an example of movement in a virtual space.

FIGS. 27A and 27B are schematic diagrams illustrating an example of replacement information referred to in an example illustrated in FIGS. 26A and 26B.

MODE(S) FOR CARRYING OUT THE INVENTION

Hereinafter, exemplary embodiment of the present technology will be described with reference to the appended drawings.

[Virtual Space Generation System]

Figure 1:
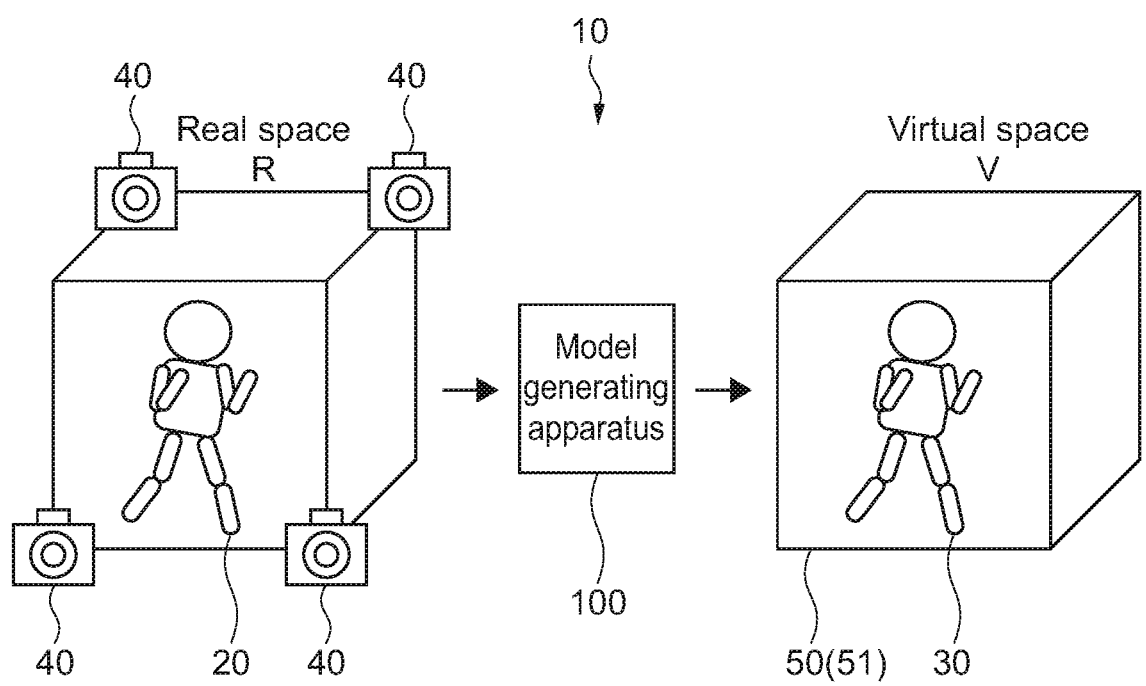
FIG. 1 is a schematic diagram for describing an overview of a virtual space generation system according to an embodiment of the present technology.

FIG. 1 is a schematic diagram for describing an overview of a virtual space generation system according to an embodiment of the present technology. A virtual space generation system 10 includes a plurality of cameras 40, a model generating apparatus 100, and a virtual space generating apparatus 50.

A plurality of cameras 40 shoots a user (person) 20 in a real space R, and the model generating apparatus 100 generates a virtual model 30 of the user 20. The generated virtual model 30 is output to the virtual space generating apparatus 50, and a virtual space V including the virtual model 30 is generated. For example, the generated virtual space V is transmitted and displayed on a display device (not illustrated) owned by the user 20. Accordingly, the user 20 can view a free viewpoint video of the virtual space V.

In the present embodiment, it is possible to generate three-dimensional (3D) computer graphics (CG) or the like in which a status of the user 20 is reproduced in detail by the virtual model 30 through the model generating apparatus 100. For example, it is possible to generate the virtual model 30 that reproduces the status of user 20 in real time by constantly photographing the user 20. Note that a target of the virtual model 30 is not limited to a person, and the virtual model 30 can be generated for any target object such as a pet or a robot.

Figure 2:
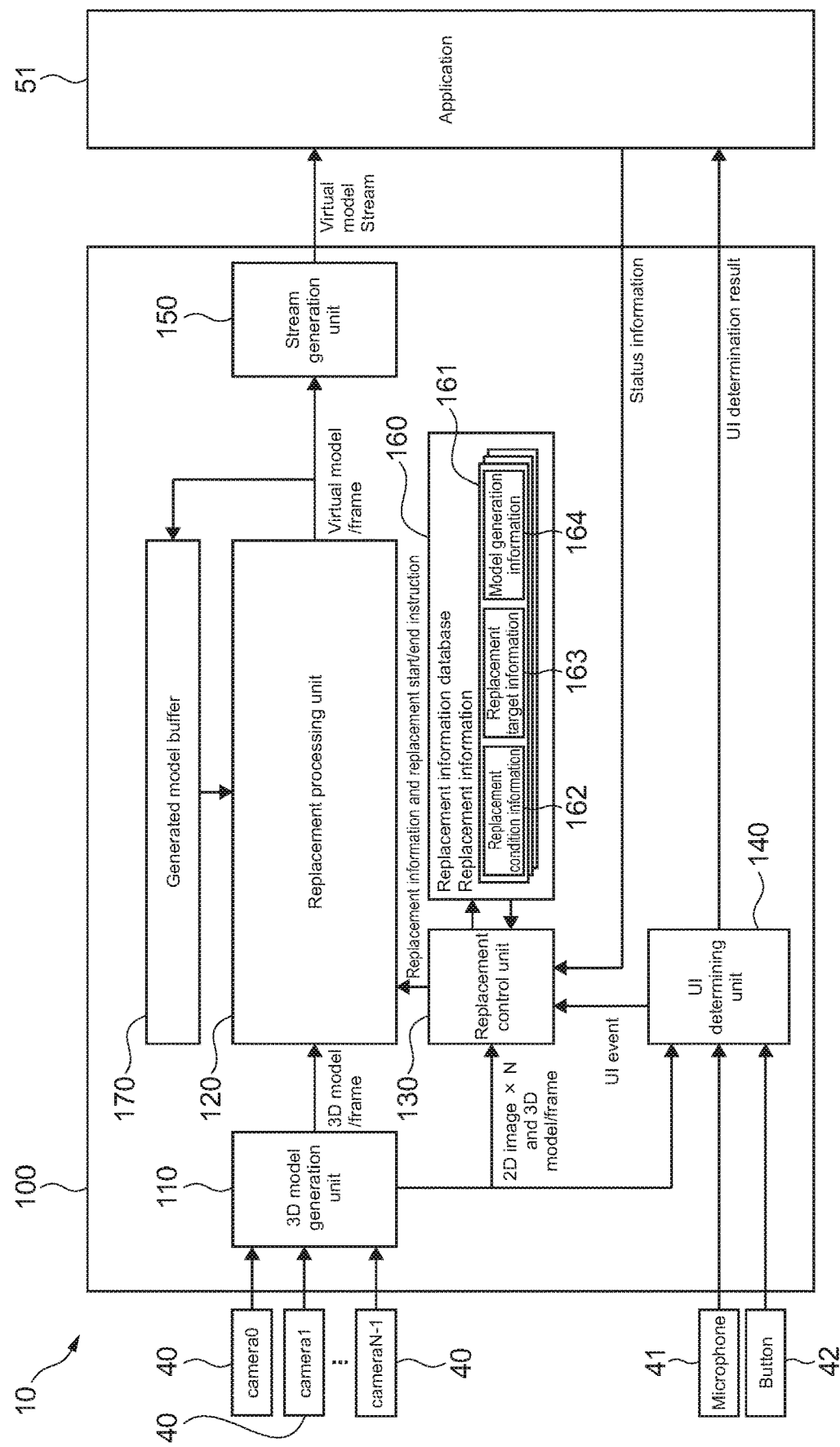
FIG. 2 is a block diagram showing a configuration example of a virtual space generation system.

An application (computer program) 51 that constructs the virtual space V is installed in the virtual space generating apparatus 50, and the virtual model 30 is output to the application 51 (see FIG. 2). Accordingly, the virtual model 30 is displayed on the virtual space V.

A connection form of a plurality of cameras 40, the model generating apparatus 100, and the virtual space generating apparatus 50 is not limited. For example, the respective apparatuses may be connected via a network such as a local area network (LAN) or a wide area network (WAN) or may be directly connected to each other via a cable or the like. For example, a plurality of cameras 40 is arranged in the vicinity of the user 20, and the model generating apparatus 100 and the virtual space generating apparatus 50 are arranged on the network. Alternatively, only the virtual space generating apparatus 50 is arranged on the network. In addition, other arbitrary connection forms or an apparatus arrangement configuration may be employed.

The model generating apparatus 100 and the virtual space generating apparatus 50 can be realized by an arbitrary computer such as a personal computer (PC). In the present embodiment, the model generating apparatus 100 corresponds to one embodiment of the information processing apparatus according to the present technology.

FIG. 2 is a block diagram illustrating a configuration example of the virtual space generation system 10. In the example illustrated in FIG. 2, the application 51 installed in the virtual space generating apparatus 50 is schematically illustrated. Further, in FIG. 2, N cameras 40 are illustrated as a plurality of cameras 40.

The N cameras 40 photograph the target object (user 20) and generate an image of the target object (an image of the user 20). The N cameras 40 are arranged at different positions with respect to a predetermined photographing area. The user 20 moves to the photography area and is photographed by the N cameras 40. Accordingly, N images of the user 20 in which the user 20 is photographed in different directions are generated.

For example, an RGB-D camera or the like is used as the camera 40. The RGB-D camera is a camera including an RGB camera that captures a color image and a distance sensor capable of measuring a distance for each pixel of a captured image. For example, a digital camera including an image sensor such as a complementary metal-oxide semiconductor (CMOS) sensor or a charge coupled device (CCD) sensor is used as the RGB camera. For example, a sensor of a time of flight (TOF) scheme or the like that measures a distance on the basis of a time taken for irradiated light to reciprocate to a target object through an infrared light emitting diode (LED) and an imaging device is used as the distance sensor.

As the user 20 or the like is photographed using the RGB-D camera, for example, an RGB-D image including color information and distance information in each pixel is generated as an image of the user 20. The RGB-D image is an image called a 2.5 D image or 3D image because it contains distance information (depth information) in a direction in which the target object is photographed. Therefore, in the present embodiment, N RGB-D cameras in which the user 20 is photographed by the N RGB-D cameras are generated. Accordingly, it is possible to generate, for example, three-dimensional coordinates of an outer shape of the user 20 or the like. Note that a specific configuration or the like of the camera 40 is not limited, and for example, an RGB camera including no distance sensor or the like may be used. Even in this case, three-dimensional coordinates of the user 20 can be generated by stereo photography or the like using a plurality of RGB cameras.

The model generating apparatus 100 includes hardware necessary for a configuration of a computer such as a central processing unit (CPU), a read only memory (ROM), a random access memory (RAM), and a hard disk drive (HDD).

Functional blocks illustrated in FIG. 2 are realized as the CPU loads a program according to the present technology stored in the ROM or the HDD onto the RAM and executes the program. An information processing method according to the present technology is executed by these functional blocks. Note that, in order to realize the functional blocks, a dedicated hardware such as a field programmable gate array (FPGA) or an image processing integrated circuit (IC) may be used appropriately.

For example, the program is installed in the model generating apparatus 100 via various recording media. Alternatively, the program may be installed via the Internet or the like.

As illustrated in FIG. 2, the model generating apparatus 100 includes a 3D model generation unit 110, a replacement processing unit 120, a replacement control unit 130, a UI determining unit 140, and a stream generation unit 150 as functional blocks. Further, a replacement information database (DB) 160 is stored in a storage unit constituted by a ROM or the like of the model generating apparatus 100, and a generated model buffer 170 is similarly constituted by a storage unit. Further, the model generating apparatus 100 includes an image acquisition unit (not illustrated).

The image acquisition unit acquires the RGB-D image of the user 20 via an interface or the like. The type of interface to be used is not limited, and for example, an interface including a high-definition multimedia interface (HDMI (registered trademark)) terminal or the like, a WiFi module or the like is used. The RGB-D image acquired by the image acquisition unit is output to the 3D model generation unit 110. In the present embodiment, the image acquisition unit corresponds to an acquisition unit that acquires the image of the target object.

The 3D model generation unit 110 generates a 3D model of the target object including the user 20 and an object used by the user 20 on the basis of the N RGB-D images. In other words, a 3D model in which statuses of the target objects (states regarding an expression, a posture, a motion, and the like of the user 20 and a status of an object used by user) included in the N RGB-D images are reproduced without change is generated. Hereinafter, for the sake of brevity, the user 20 and the object used by the user 20 are also referred to collectively as a user 20.

In the present embodiment, coordinate conversion or the like is performed on the RGB-D image captured by the RGB-D camera. Specifically, a position and a depth of each pixel of the RGB-D image are converted to coordinates of a predetermined three-dimensional coordinate system. As a result, three-dimensional coordinates (point cloud) of a plurality of points indicating a three-dimensional shape of the user 20 are calculated.

A process of calculating the point cloud is performed on the N RGB-D images. Accordingly, for example, it is possible to calculate a point cloud indicating the entire image of the user 20 with a high degree of accuracy. A mesh model indicating a three-dimensional shape of the user 20 is generated on the basis of the calculated point cloud.

Texture information related to a skin color of the user 20, colors of clothes worn by the user, or is acquired on the basis of the RGB-D image. A color or the like of a mesh model surface is set on the basis of the acquired texture information, and a 3D model of the user 20 or the like is generated. Therefore, in the 3D model, a shape and a color of the user 20 in the RGB-D image are reproduced with a high degree of accuracy. Note that a method of generating the 3D model is not limited, and the 3D model may be generated by other methods.

As illustrated in FIG. 2, in the present embodiment, information of the 3D model or N 2D images is output from the 3D model generation unit 110 to the other functional blocks. Here, the 2D image is a two-dimensional image obtained by excluding distance information (depth information) or the like from the RGB-D image. For example, in a case in which the 3D model is generated at a predetermined frame rate, the information of the 3D model is output in units of frames. In this case, for example, the N 2D images are generated from the N RGB-D images used for generating the 3D model to be output, and are output together with the information of the 3D model. Note that the information or the like output to the other functional blocks is not limited, and for example, the N RGB-D images may be output without change instead of the N 2D images. In the present embodiment, an RGB-D image and a 2D image that is a part of the RGB-D image corresponds to the image of the target object.

The replacement processing unit 120 can change at least a part of the 3D model generated by the 3D model generation unit 110. In other words, it is possible to generate a 3D model in which at least a part of the statuses of the target objects (the statuses regarding the expression, the posture, the motion, and the like of the user 20 and the status of the object used by the user 20) included in the N 2D images It is possible to generate a modified the 3D model. The 3D model which has undergone the change process executed by the replacement processing unit 120 is a model in which the target object is reproduced with lower reproducibility than the 3D model before the change.

For example, a process of replacing at least a part of the 3D model, a process of deleting at least a part, a process of adding a predetermined object to the 3D model, and the like is performed as a change process for changing the 3D model. In addition to a case in which a part or the like of the body of the user 20 in a stationary status is replaced or deleted, a case in which a part of the body in the stationary status is replaced with a status in which it performs a predetermined motion or the like is included as well. A case in which the controller or the like used by the user 20 is deleted or a case in which it is replaced with another one is also included. In addition, the process of changing the 3D model is not limited, and a specific example will be described in detail later.

The replacement control unit 130 controls an operation of the replacement processing unit 120. In the present embodiment, the replacement control unit 130 controls whether or not the change process by the replacement processing unit 120. Therefore, switching between a mode in which the change process by the replacement processing unit 120 is executed and a mode in which the change process is not executed is appropriately performed by the replacement control unit 130. In a case in which the change process is not executed, the 3D model with high reproducibility is output from the replacement processing unit 120. In a case in which the change process is executed, the 3D model with low reproducibility is output from the replacement processing unit 120.

The control of whether or not the change process by the replacement control unit 130 is executed is performed on the basis of replacement information 161 stored in the replacement information DB 160. As illustrated in FIG. 2, the replacement information 161 includes replacement condition information 162, replacement target information 163, and model generation information 164.

The replacement condition information 162 is information including a determination condition of whether or not at least some of the statuses of the target object are changed. In the present embodiment, a replacement condition will be described as the determination condition. In other words, the replacement condition in this description includes the determination condition regarding various changes of the 3D model including a deletion condition or the like in addition to a replacement condition. Further, the change process by the replacement processing unit 120 is also referred to as a replacement process.

The replacement control unit 130 determines whether or not the replacement condition included in the replacement condition information 162 is satisfied on the basis of the information related to the user 20 or the virtual space V input from the 3D model generation unit 110, the UI determining unit 140, and the application 51. In a case in which the replacement condition is satisfied, for example, an instruction to start and end the replacement process or a specific instruction of the replacement process (such as how to change which part) is output to the replacement processing unit 120.

The replacement target information 163 is specifying information specifying a part which is a replacement target. The model generation information 164 is information including a method of changing a part which is the specified replacement target. The information is stored in association with the replacement condition information 162. In other words, the replacement target information 163 and the model generation information 164 correspond to information related to how to change at least some of the statuses of the target object associated with the replacement condition.

A plurality of pieces of replacement information 161 corresponding to various situations is recorded in the replacement information DB 160. Therefore, it is possible to execute the replacement process corresponding to various situations, and it is possible to generate the 3D model desired by the user 20 with a high degree of accuracy. Note that the information included in the replacement information 161 is not limited, and arbitrary information that makes it possible to realize a desired replacement process may be used.

In the present embodiment, the 3D model generation unit 110, the replacement processing unit 120, and the replacement control unit 130 cooperate to realize a generation unit. In the present embodiment, the replacement control unit 130 also functions as a generation control unit.

A process in which the 3D model with high reproducibility is generated without executing the replacement process by the replacement processing unit 120 under the control of the replacement control unit 130 corresponds to the first generation process in the present embodiment. Further, the 3D model with high reproducibility output from the replacement processing unit 120 corresponds to a first model in which the target object is reproduced with first reproducibility and corresponds to the virtual model 30 of the user 20 illustrated in FIG. 1. Note that the virtual model 30 generated with no replacement process is also described as a first virtual model generated by a first generation process.

The replacement process is executed by the replacement processing unit 120 under the control of the replacement control unit 130, and the process in which the 3D model with low reproducibility is generated corresponds to a second generation process in the present embodiment. Further, the 3D model with low reproducibility output from the replacement processing unit 120 corresponds to a second model in which the target object is reproduced with second reproducibility lower than the first reproducibility and is the virtual model 30 of the user 20 illustrated in FIG. 1. Note that the virtual model 30 generated by the replacement process is also described as a second virtual model generated by the second generation process.

In other words, in the present embodiment, it is possible to perform switching between the first virtual model with high reproducibility and the second virtual model with low reproducibility and perform it as the virtual model 30 of the user 20 displayed in the virtual space V. For example, in various situations, it may be possible to enjoy virtual experience naturally without discomfort when a partially changed virtual model 30 is displayed rather than when the virtual model 30 in which the status of the user 20 is reproduced without change. In other words, as the first and second generation processes are appropriately switched and the first and second virtual models are switched, it is possible to provide the user 20 with the natural virtual experience. The details will be described later.

Note that, in the present embodiment, switching of whether or not the replacement process by the replacement control unit 130 is performed corresponds to switching between the execution of the first generation process and the execution of the second generation process by the generation control unit.

The UI determining unit 140 recognizes or determines an instruction input by the user 20 via various user interfaces. For example, the UI determining unit 140 recognizes an operation input by a gesture of the user 20, an operation input by voice, or the like on the basis of the 2D image of the user 20 or the information from a microphone 41 and a button 42 connected to the model generating apparatus 100 Do. The type of interface to be used or the like is not limited, and for example, a multimodal interface using a gesture or a voice may be used.

For example, content of a service or the like requested by the user 20 is determined by the UI determining unit 140 and transmitted to the application 51 as a UI determination result. Accordingly, the application 51 can provide the user 20 with the requested service or the like. Further, information indicating that the user 20 is performing an operation input is transmitted to the replacement control unit 130 as a UI event. Accordingly, for example, in a case in which the user 20 is performing a predetermined operation input, the replacement control unit 130 can determine that the replacement process is performed.

The generated model buffer 170 holds information of the virtual model 30 (the 3D model) output from the replacement processing unit 120 for a certain period. In other words, the information of the virtual model 30 output in the past is stored by a predetermined number of frames. The stored information of the virtual model 30 can be fed back to the replacement processing unit 120. Accordingly, for example, it is possible to execute the replacement process or the like using the information or the like of the virtual model 30 generated immediately before.

The stream generation unit 150 generates a video (stream) of the virtual model 30 on the basis of the information of the virtual model 30 output from the replacement processing unit 120 in units of frames. A method of generating a stream is not limited, and an arbitrary rendering process corresponding to a format of the 3D model or a specification of the application 51 may be executed. The generated virtual model 30 stream is output to the application 51.

The application 51 is a computer program that generates the virtual space V using the virtual space generating apparatus 50. The application 51 acquires video information or the like of the virtual model 30 and arranges the virtual model 30 at an appropriate position in the virtual space V. Accordingly, the virtual model 30 of the user 20 is reproduced in the virtual space V.

Further, the application 51 can output status information related to the status of the virtual model 30 in the virtual space V to the replacement control unit 130. The status information is information indicating a status in which the virtual model is, and is generated, for example, in accordance with an instruction of a motion to the virtual model 30 or an instruction of a motion, an effect, or the like defined as an expression in the virtual space V. For example, in a case in which an instruction of a predetermined motion is being input via the controller or the like used by the user 20, the status information indicating that the instructed motion is being performed is generated. In addition, various status information is generated.

Figure 3:
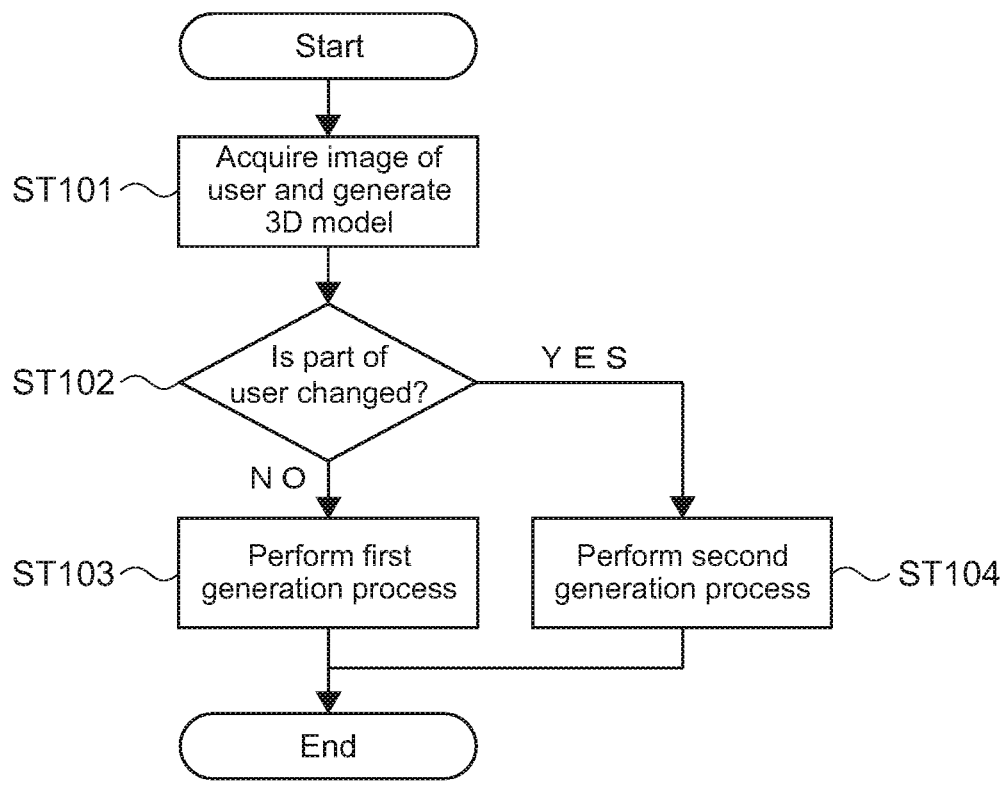
FIG. 3 is a flowchart illustrating an overview of generation of a virtual model.

FIG. 3 is a flowchart illustrating an overview of generation of the virtual model 30. The image acquisition unit acquires the 2D image (RGB-D image) of the user 20 (target object) (step 101). The replacement control unit 130 determines whether or not at least some of the statuses of the user 20 are changed on the basis of the replacement condition information 162 (step 102).

In a case in which it is determined that at least some of the statuses of the user 20 are not changed, that is, it is determined that the replacement condition is not satisfied (NO in step 102), the first generation process is executed (step 103). In the present embodiment, an instruction not to execute the replacement process is output from the replacement control unit 130 to the replacement processing unit 120. Then, the 3D model generated by the 3D model generation unit 110 is output without change as the first virtual model. Accordingly, the first virtual model in which the status of the user 20 contained in the 2D image is reproduced is generated.

In a case in which it is determined that at least some of the statuses of the user 20 are changed, that is, it is determined that the replacement condition is satisfied (YES in step 102), the second generation process is executed (step 104). In the present embodiment, an instruction to execute the replacement process is output from the replacement control unit 130 to the replacement processing unit 120. Accordingly, the replacement process is executed on the 3D model generated by the 3D model generation unit 110 through the replacement processing unit 120, and a resulting 3D model is output as the second virtual model. Accordingly, the second virtual model in which at least some of the statuses of the user 20 contained in the 2D image are changed is generated.

As described above, the operation of the replacement processing unit 120 is controlled by the replacement control unit 130, and the first virtual model and the second virtual model are switched and generated. Accordingly, it is possible to appropriately display, for example, appropriate virtual models 30 corresponding to various situations of the user 20 or the virtual space V.

Note that the method of generating the virtual model 30 is not limited to the method described above, and any other method may be used. For example, in the present embodiment, the 3D model generation unit 110 generates the 3D model of the user 20 in accordance with the acquisition of the 2D image of the user 20. Then, the first and second generation processes are switched in a manner that depends on whether or not the replacement process is performed on the generated the 3D model.

Alternatively, first, the determination of step 102 may be performed, and then either of the first and second generation processes may be started on the basis of the determination result. At this time, for example, each of the first and second virtual models may be generated directly on the basis of the 2D image of the user 20.

The second generation process will be described below using a specific example.

Figure 4:
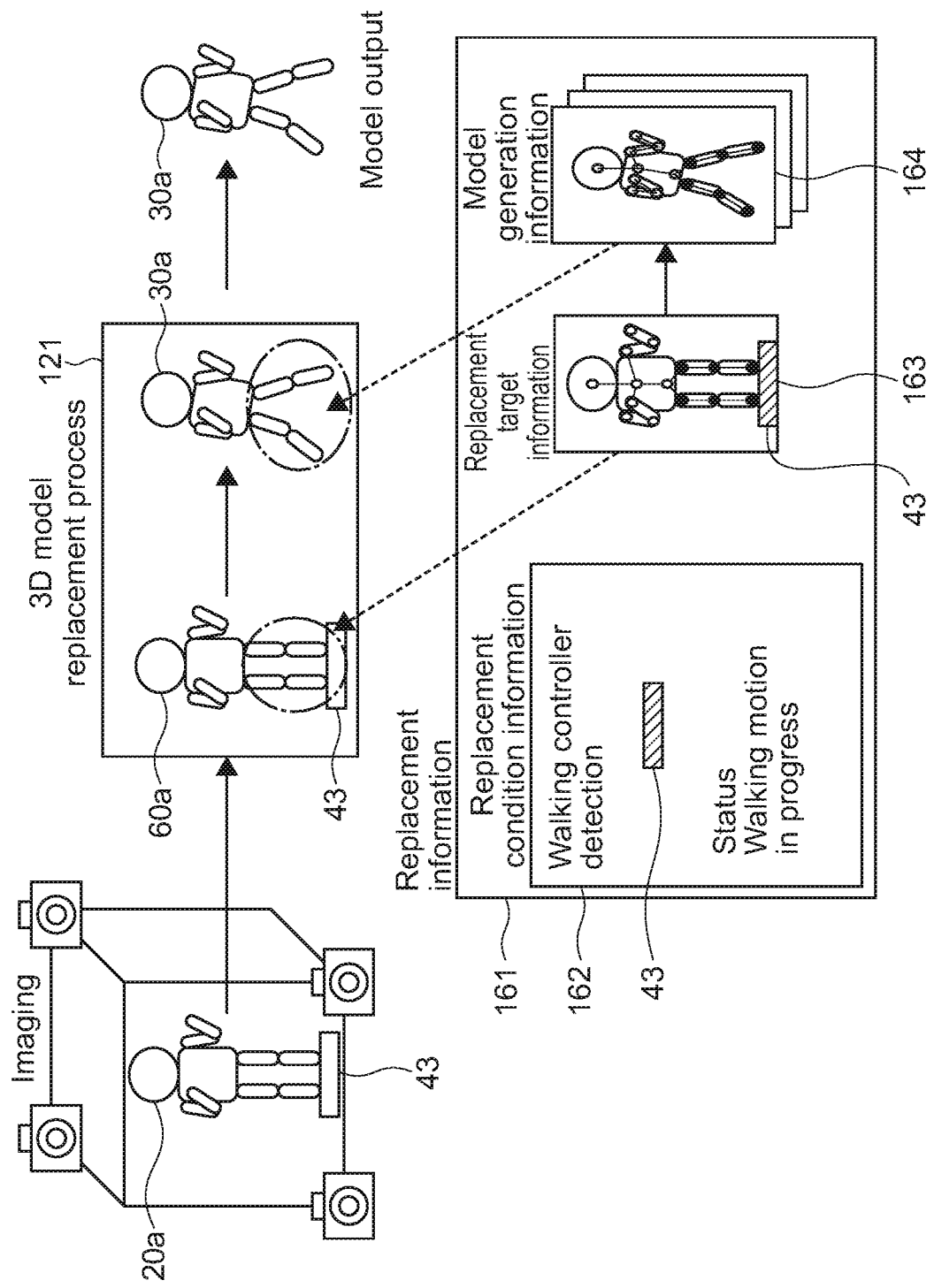
FIG. 4 is a schematic diagram illustrating an example of a second generation process.

FIG. 4 is a schematic diagram illustrating an example of the second generation process. In the example illustrated in FIG. 4, a replacement process 121 is executed on a 3D model 60*a* of a user 20*a* using a walking controller 43, and a second virtual model 30*a* performing a walking motion is generated. Note that, in FIG. 4, the replacement information 161 used for the replacement process 121 is schematically illustrated.

The walking controller 43 illustrated in FIG. 4 is a type used in a state in which the user 20*a* stands on it, and the user 20*a* can give an instruction to cause the second virtual model 30*a* to move (walk/run) within the virtual space V by moving a body weight. It is possible to control a moving direction, a moving speed, or the like of the second virtual model 30*a* by adjusting a direction or a size for moving the body weight. In other words, the user 20*a* can cause the second virtual model 30*a* to execute the walking motion while keeping a substantially upright posture without actually performing the walking motion.

The instruction of the walking motion or the like input via the walking controller 43 is output to the application 51 and output to the replacement control unit 130 as the status information.

As described above, in the present embodiment, the 3D model generation unit 110 first generates the 3D model 60*a* including the user 20*a* and the walking controller 43 on the basis of N 2D images of the user 20 who uses the walking controller 43.

Figure 5:
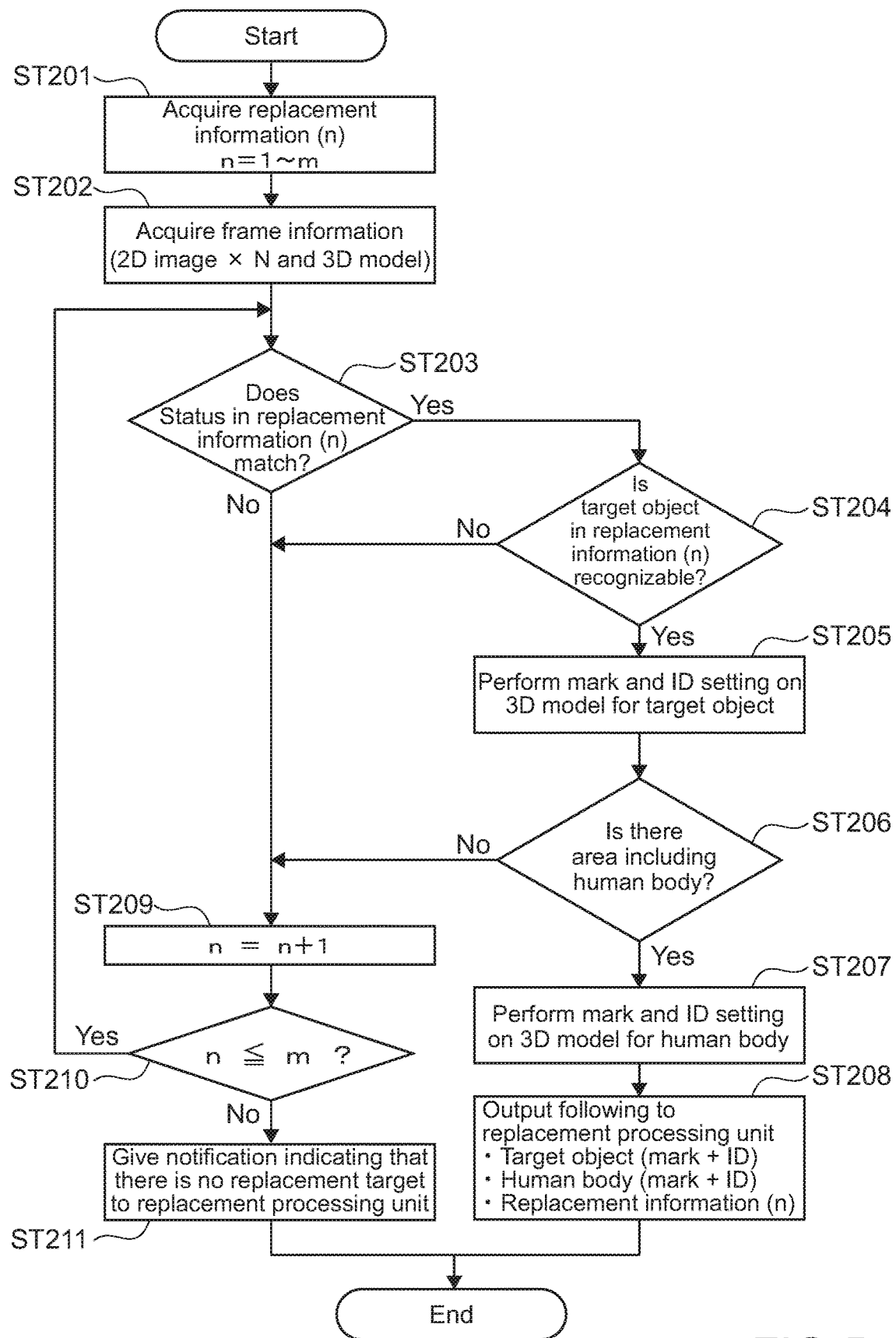
FIG. 5 is a flowchart illustrating a process example of a replacement control unit.
Figure 6:
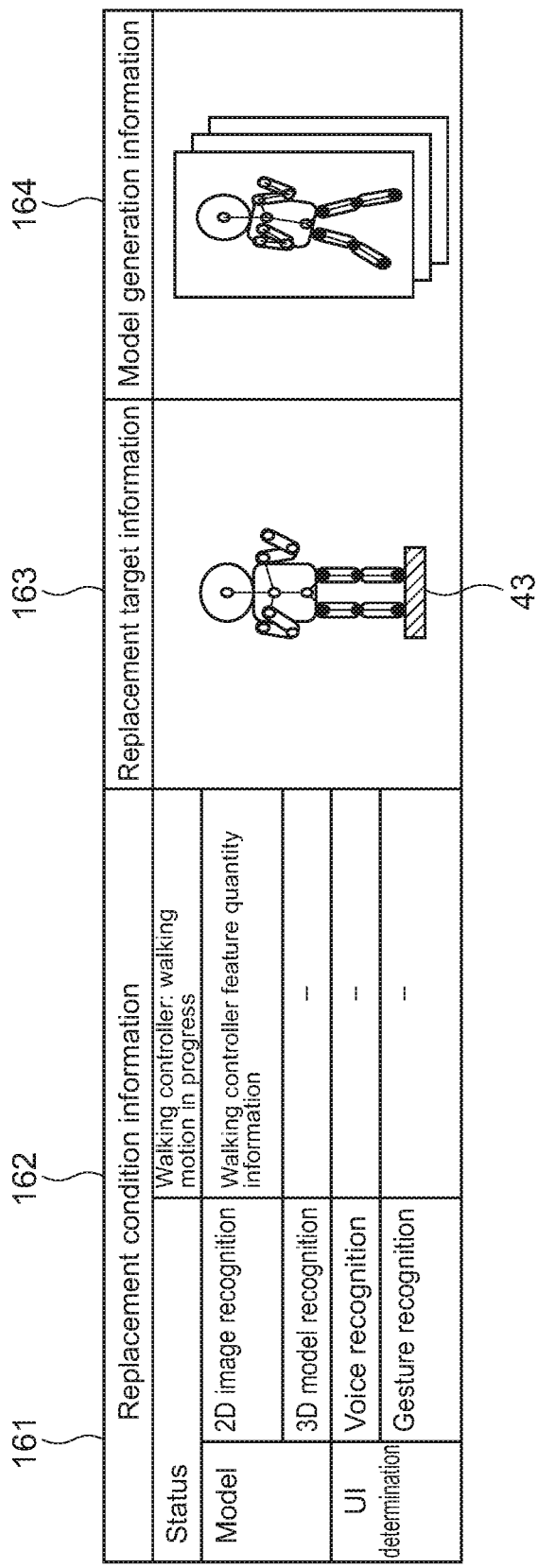
FIG. 6 is a schematic diagram illustrating an example of replacement information referred to in an example illustrated in FIG. 4.

FIG. 5 is a flowchart illustrating a process example of the replacement control unit 130. FIG. 6 is a schematic diagram illustrating an example of the replacement information referred to in the present example and illustrates a detail of the replacement information 161 illustrated in FIG. 4. As described above, the replacement information 161 includes the replacement condition information 162, the replacement target information 163, and the model generation information 164. In the present embodiment, the status information, the target object (denoted as model in FIG. 6), and items regarding UI determination are included as the replacement condition.

A plurality of pieces of replacement information 161 (1 to m) is acquired from the replacement information DB 160

(step 201). Further, the 3D model 60a generated by the 3D model generation unit 110 and the N 2D images are acquired (step 202).

It is determined whether or not the replacement condition included in the plurality of pieces of replacement condition information 162 of 1 to m is satisfied. Specifically, the replacement information 161 is read in order, and it is first determined whether or not the status in the replacement condition information 162 matches (step 203). In the present embodiment, it is assumed that the replacement information 161 illustrated in FIG. 6 is read, and a status "walking motion is in progress" in accordance with the instruction of the walking motion via the walking controller 43 matches (Yes in step 203).

Note that, in a case in which the instruction of the walking motion is not input via the walking controller 43, it is determined that the replacement condition is not satisfied, and the other replacement information 161 is read (a flow of No in step 203, step 209, and Yes in step 210). In a case in which there is no replacement information which is not read yet (No in step 210), a notification indicting that there is no replacement target is given to the replacement processing unit 120, and the process ends (step 211).

In a case in which it is determined that the status matches, it is determined whether or not the target object stored in the replacement condition information 162 can be recognized (step 204). In the present embodiment, the replacement condition information 162 includes a recognition feature quantity in a 2D video (image) of the walking controller 43. The replacement control unit 130 determines whether or not a part in which the recognition feature quantity matches is detected for each of the N 2D images acquired in step 202. In a case in which there is a matching part, it is determined that the target object can be recognizable (Yes in step 204). In a case in which there is no part in which the recognition feature quantity matches in the 2D image, it is determined that the replacement condition is not satisfied, and the process proceeds from No in step 204 to step 209.

Note that the method of recognizing the target object is not limited, and an arbitrarily technique such as a matching technique may be used. In the replacement information illustrated in FIG. 6, as the replacement condition, the presence or absence of recognition based on the N 2D images and the presence or absence of recognition based on the 3D model are set as different items. On the other hand, a condition that the target object is recognized in at least one of the 2D image or the 3D model regardless of whether it is 2D image or the 3D model may be set as the replacement condition.

In a case in which the target object, that is, the walking controller 43 in the present example is recognized, the part corresponding to the walking controller 43 on the 3D model 60a is marked (step 205). Specifically, each piece of vertex information on the 3D model corresponding to each point is acquired on the basis of coordinates of each point in the 2D image that matches the recognition feature quantity of the walking controller 43. Each piece of vertex information obtained is marked as vertex information indicating each point on the walking controller 43.

Further, an object ID is set in the part corresponding to the walking controller 43 on the 3D model 60a on the basis of each piece of marked vertex information. Note that, in the present example, the walking controller 43 is a part to be deleted. Therefore, the target object is also specifying information specifying a part which is the replacement target.

Next, it is determined whether or not there is an area including a human body (step 206). In other words, it is determined whether or not a body of a person is detected. A method of detecting the human body is not limited, and an arbitrary technique using the 2D image or the 3D model 60a may be used. In a case in which no human body is detected, it is determined that the replacement condition is not satisfied, and the process proceeds from No in step 206 to step 209.

In a case in which a human body is detected (Yes in step 206), a part corresponding to the human body on the 3D model 60a is marked (step 207). For example, using a method similar to that in step 205, vertex information corresponding to the human body on the 3D model 60a is marked, and an object ID is set in the part corresponding to the human body.

The mark and the ID of the target object (the walking controller 43), the mark and the ID of the human body (the user 20a), and the replacement information are transmitted to the replacement processing unit, and the processing ends (step 208). In other words, in this case, it is determined that the replacement condition is satisfied, the process proceeds from Yes in step 102 to step 104 of FIG. 3, and the second generation process is executed.

Figure 8:
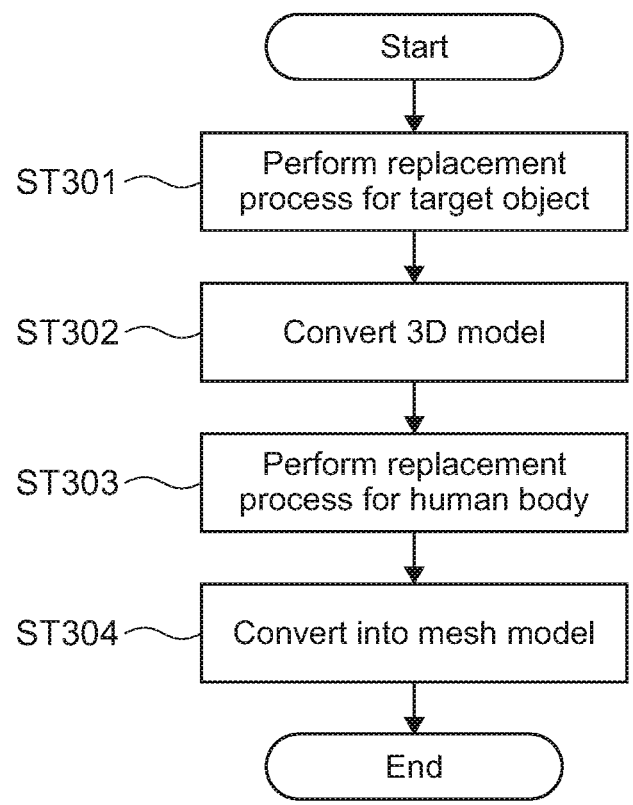
FIG. 8 is a flowchart illustrating an example of a replacement process.

FIG. 7A is a block diagram illustrating a specific configuration example of the replacement processing unit. FIG. 7B is a schematic diagram regarding a process executed by each block of the replacement processing unit 120. FIG. 8 is a flowchart illustrating an example of the replacement process. Steps attached to FIG. 7B correspond to steps illustrated in FIG. 8.

The replacement processing unit 120 includes a replacement process control unit 122, a target object replacement processing unit 123, a body model converting unit 124, a body model replacement processing unit 125, and a mesh model converting unit 126. An operation of each block is controlled by the replacement process control unit 122 on the basis of the replacement information 161 output from the replacement control unit 130 or the like.

First, the replacement process for the target object is executed (step 301). The target object is replaced with another object or the like on the basis of the model generation information 164 by the target object replacement processing unit 123. Note that, in a case in which the model generation information 164 does not include information of another object, the target object is simply deleted.

In the present embodiment, the part corresponding to the walking controller 43 is deleted from the 3D model 60a on the basis of the vertex information of the walking controller 43. As described above, an object ID is set in the part (segment) corresponding to the walking controller 43 on the 3D model 60a. Therefore, it is possible to easily delete the walking controller 43 by deleting the segment designated by the object ID.

The body model converting unit 124 estimates a skeleton of the person (bone recognition), and executes conversion to a body model 70 on the basis of this (step 302). The body model 70 is a model in which the part corresponding to the human body in the 3D model 60a is converted into a form in which deformation or replacement is easily performed using the features of the human body. As the body model 70, a deformable model in which a relative positional relation between the mesh of the 3D model 60a and the skeleton is estimated, a parametric model in which the size (parameter) of each part of the human body can be controlled, or the like is used appropriately. The body model 70 is generated on the basis of anatomical constraints, for example, on the basis of the bone model generated by bone recognition. In addition, an arbitrary model capable of expressing the human body or the like may be used as the body model 70.

The technique used for the bone recognition and the conversion to the body model 70 is not limited. For example, as the bone recognition, a technique capable of estimating the skeleton of the person from the 2D image, the mesh model, or the like or an arbitrary technique using machine learning, or the like may be used. Further, as the conversion to the body model 70, an arbitrary conversion method capable of deforming the mesh model or the like or the like may be used.

The body model replacement processing unit 125 executes the body model replacement process including change (deformation), replacement, or the like of the body model 70 (step 303). In FIGS. 7A and 7B, the body model replacement processing unit 125 replaces both feet of the body model 70 with a walking motion. For example, the part (both feet) designated by the replacement target information 163 is replaced with a model that walks on the basis of the model generation information 164. Therefore, a replaced body model 71 in which the person is changed from the upright status to the walking motion state is generated.

As described above, in the present embodiment, the body model converting unit 124 and the body model replacement processing unit 125 execute the replacement process 121 for the human body. As the replacement process 121 in body model 70 is performed, it is possible to easily express the natural walking motion. For example, it is possible to generate the model in which the upper body of the person is deformed appropriately in accordance with the walking motion of the person, and it is possible to sufficiently reduce the discomfort which the user feels. Note that the human body is identified using the object ID or the like.

In FIG. 6, the replacement target information 163 serving as the replacement target and the model generation information 164 indicating the replacement method of the replacement target are generated on the basis of the bone model (skeleton). For example, in a case in which the skeletons of both feet are designated as the replacement target information 163, the replacement models related to the skeletons of both feet are stored in the model generation information 164. Therefore, the skeleton designated by the replacement target information 163 and the skeleton generated by the model generation information 164 are set to be identical to each other. Note that it is not limited to the bone model, and for example, an arbitrary parameter such as a feature quantity related to each part of the human body may be used.

Note that, as illustrated in FIG. 6, information of a plurality of frames is held in the model generation information 164 to express the walking motion or the like. For example, during the walking motion, it is possible to easily express continuation of the walking motion by repeatedly using information of a plurality of frames or the like.

The mesh model converting unit 126 converts the body model 71 after replacement into the mesh model again (step 304). Accordingly, the second virtual model 30a is generated, and the process ends. The generated second virtual model 30a is appropriately output to the stream generation unit 150 or the like and displayed for the user as an animation.

As described above, the replacement control unit 130 selects execution of the second generation process on the basis of the replacement information 161 in a case in which the instruction of the walking motion is input. Then, as the second generation process, the second virtual model 30a that executes the walking motion is generated. Accordingly, even in a case in which the user 20a is not performing the walking motion or the like, the second virtual model 30a of the user 20a performing the walking motion is displayed in the virtual space V. As a result, it is possible to provide a natural virtual experience with less burden on the user 20a.

Note that it is also possible to generate a model indicating a transition status in a case in which switching from the first generation process to the second generation process is performed. For example, in the present example, in a case in which an instruction to start the walking motion is given, a motion from the status of the first virtual model (the status of the user 20a) at a start time point to the start of walking is generated as a transition status model. Accordingly, it is possible to express a form in which transition from a status before the motion is started to a status in which the motion is performed is performed smoothly.

Similarly, it is also possible to generate a model indicating a transition status in a case in which switching from the second generation process to the first generation process is performed. For example, in a case in which an instruction to end the walking motion is given, a motion of stopping walking toward that status is generated as the transition state model so that it becomes the status of the first virtual model at an end time point (the status of the user 20a). For example, in a case in which the user 20a is sitting, the transition status such as sitting while stopping walking is expressed.

A method of generating the model indicating the transition status is not limited, and for example, an estimation technique by machine learning based on information of the start motion and the end motion for various motions or arbitrarily other techniques may be used.

Further, a feature specific to the user 20a may be reflected in the replaced motion. For example, in the present example, the walking motion in which a walking style of the user 20a is reflected may be expressed. The feature of the motion specific to the user 20a can be acquired on the basis of, for example, the 2D image or the like in which the motion of the user 20a is photographed in advance. For example, while the user 20a is using the virtual space generation system 10, it is possible to analyze the feature of the user 20a for various motions such as walking, running, sitting, sitting, standing, and jumping on the basis of the 2D image of the user 20a and store them. Other arbitrary techniques such as machine learning may be used.

Figure 9:
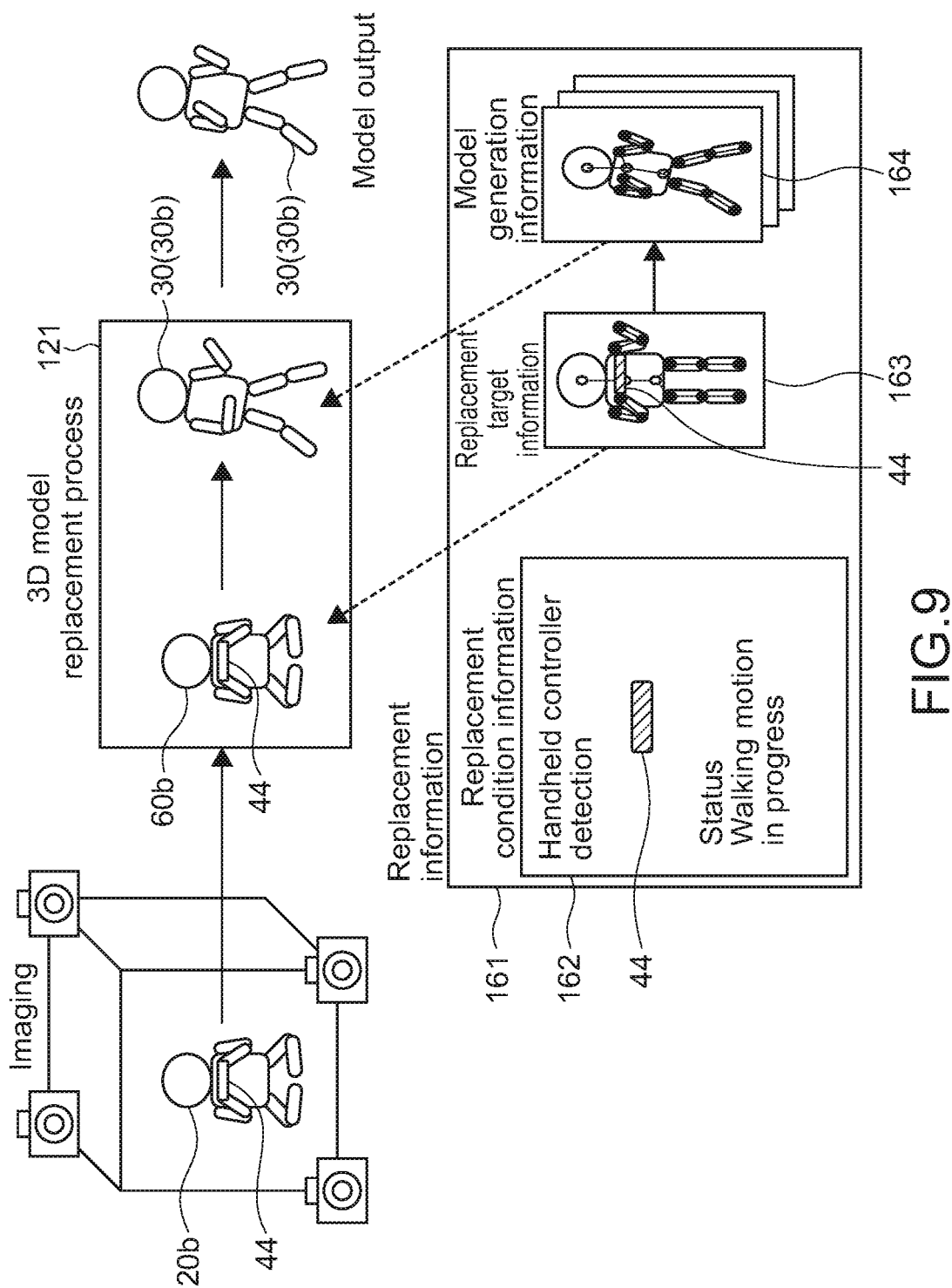
FIG. 9 is a schematic diagram illustrating another example of a second generation process.
Figure 10:
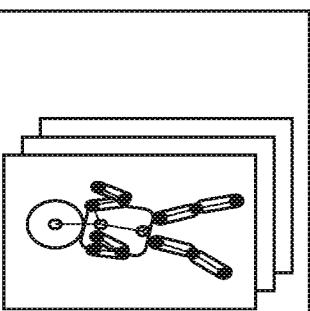
FIG. 10 is a schematic diagram illustrating an example of replacement information referred to in an example illustrated in FIG. 9.

FIG. 9 is a schematic diagram illustrating another example of the second generation process. FIG. 10 is a schematic diagram illustrating an example of the replacement information referred to in the present example. In the example illustrated in FIG. 9, the replacement process 121 is executed on a 3D model 60b of a user 20b using a handheld controller 44, and a second virtual model 30b that performs a walking motion is generated.

The handheld controller 44 is operated by the hands of the user 20b. The user 20b can control various types of motions of the virtual model 30 using a button or a joystick of the handheld controller 44 or the like. For example, as illustrated in FIG. 9, the user 20b can cause the virtual model 30 to execute various motions via the handheld controller 44 while keeping the sitting posture.

It is determined whether or not the status matches on the basis of the replacement condition information 162. In a case in which the status in which the walking motion is being performed in accordance with an instruction from the handheld controller 44 matches, it is determined whether the handheld controller 44 can be recognized. In the replacement information 161 illustrated in FIG. 10, it is determined whether or not the recognition feature quantity of the handheld controller 44 matches in the 3D model 60*b*.

In a case in which the handheld controller 44 is recognized, the corresponding part is marked and assigned an ID. Further, the human body is detected, and marking and ID assignment are performed. The mark and the ID of the handheld controller 44, the mark and the ID of the human body, and the replacement information 161 are transmitted to the replacement processing unit 120. Then, the replacement process 121 (the second generation process) is executed.

As illustrated in FIG. 9, when the replacement process 121 is performed on the handheld controller 44, it is assumed that, for example, the user 20*b* is sitting. For this reason, a wide range is designated as a part to be replaced. In the replacement target information 163 of the present example, the handheld controller 44, both arms using it, and both legs are designated as the replacement targets. Further, information of a model indicating walking motions of both arms and both legs is stored in the model generation information 164.

The handheld controller 44 in the 3D model 60*b* is deleted on the basis of the replacement target information 163 and the model generation information 164. Further, both arms and both legs of the person are replaced with the model that performs the walking motion, and the second virtual model 30*b* that performs the walking motion is generated.

In the example illustrated in FIG. 9, the second virtual model 30*b* that performs the walking motion is generated from the 3D model 60*b* of the sitting posture. In this case, with the second generation process, the second virtual model 30*b* which executes a motion of transitioning to the walking operation such as a motion of executing a motion of standing up from a sitting status and then executing a motion of starting walking is generated. For example, it is possible to express a series of motions transitioning to the walking operation on the basis of information of a plurality of frames included in the model generation information 164. Accordingly, it is possible to express the form of smoothly transitioning to the walking motion.

Note that, in a case in which the 3D model 60*b* is generated on the basis of the 2D image obtained by photographing the user 20*b* in the sitting status, information such as a foot is unlikely to be sufficiently obtained. Therefore, a satisfactory second virtual model 30*b* is unlikely to be obtained even though the 3D model is deformed using conversion to the body model or the like. In this case, for example, a method of obtaining the 3D model 60*b* of the user 20*b* of the upright posture and generating the second virtual model 30*b* using information such as a mesh or texture of the 3D model 60*b* may be executed.

Figure 11:
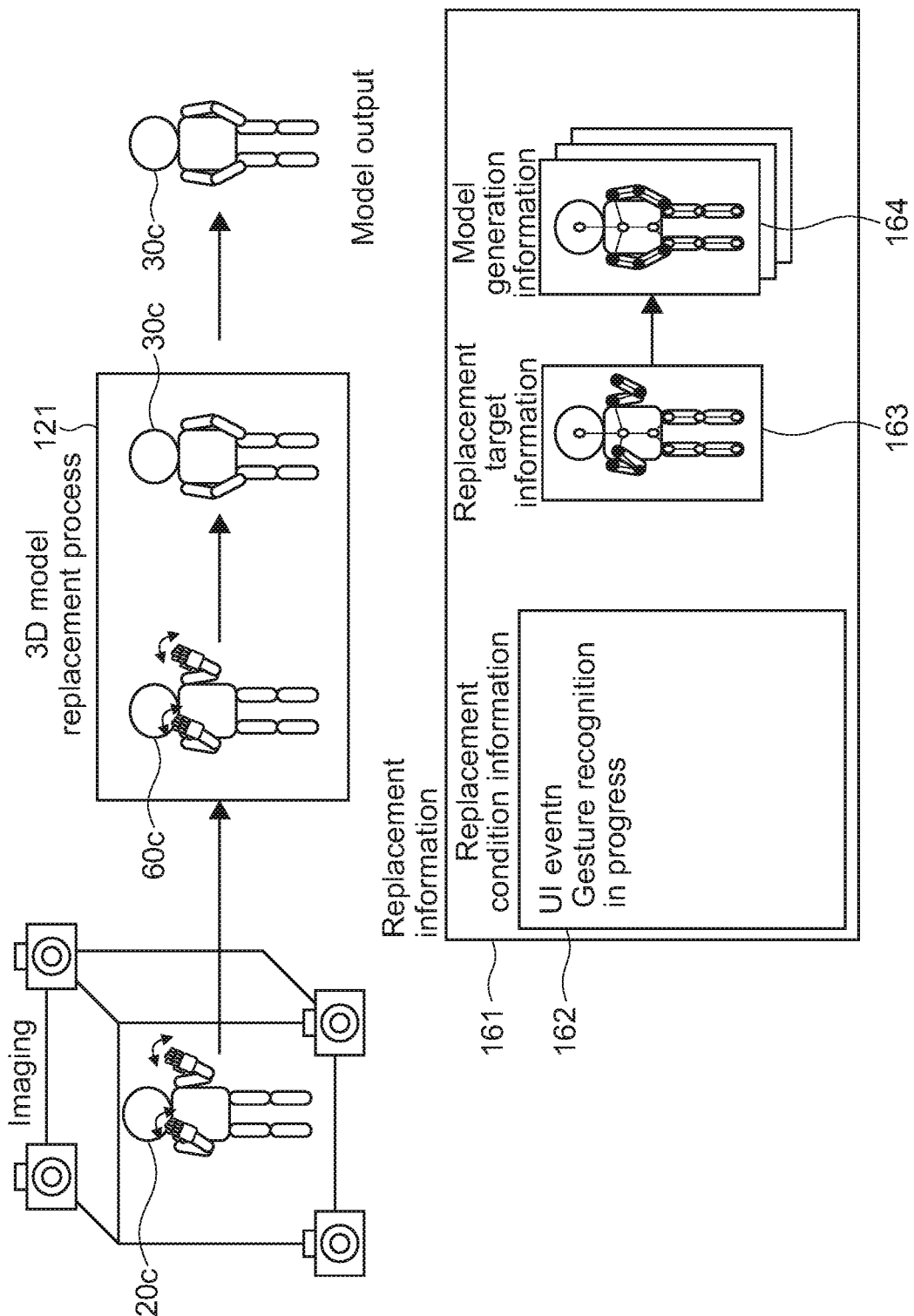
FIG. 11 is a schematic diagram illustrating another example of a second generation process.

FIG. 11 is a schematic diagram illustrating another example of the second generation process. FIG. 12 is a schematic diagram illustrating an example of the replacement information referred to in the present example. In the example illustrated in FIG. 11, the replacement process 121 is executed on a 3D model 60*c* of a user 20*c* that performs an operation input by gesture, and a second virtual model 30*c* that does not execute a gesture is generated.

The user 20*c* can perform an operation input corresponding to a predetermined gesture by executing the gesture. In the example illustrated in FIG. 11, the user 20*c* performs a gesture of bending both elbows and shaking both hands. The UI determining unit 140 recognizes the gesture of the user 20*c* on the basis of the N 2D images and the 3D model 60*c*.

Figures 13, 14:
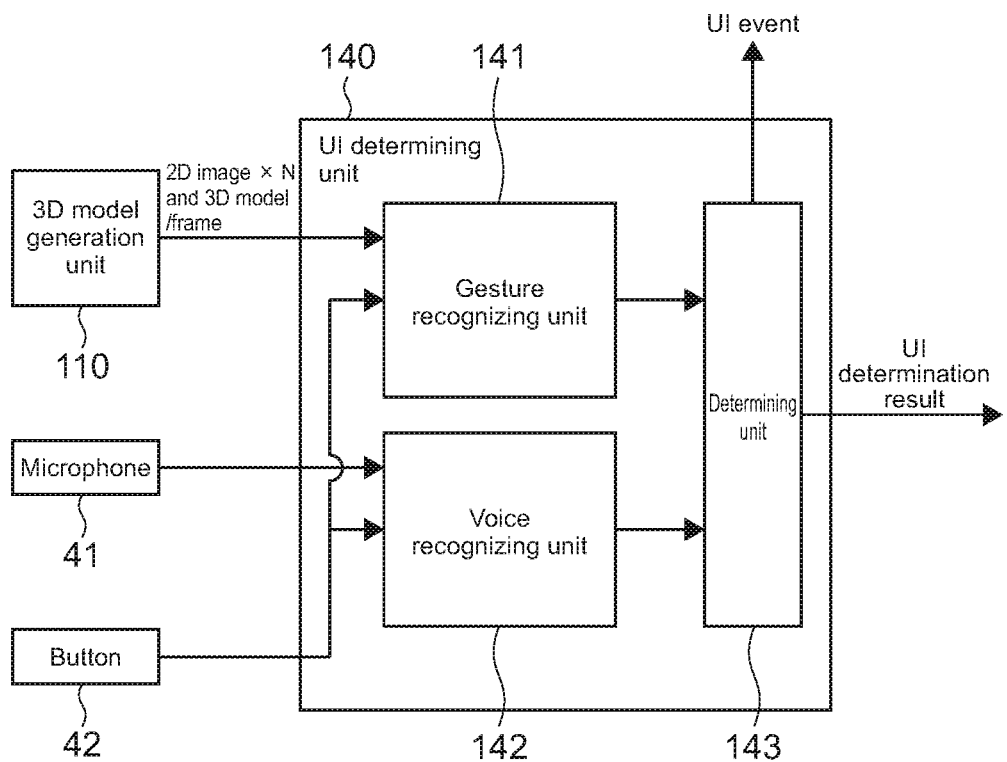
FIG. 13 is a block diagram illustrating a specific configuration example of a UI determining unit.
FIG. 14 is a table illustrating an example of UI events output to a replacement control unit.

FIG. 13 is a block diagram illustrating a specific configuration example of the UI determining unit 140. The UI determining unit 140 includes a gesture recognizing unit 141, a voice recognizing unit 142, and a determining unit 143. Operations of the gesture recognizing unit 141 and the determining unit 143 in a case in which an operation input by gesture is performed will be described below. Note that the operation of the voice recognizing unit 142 will be described using another example.

The operation input by gesture is performed by the user 20*c*. The 3D model generation unit 110 generates the 3D model 60*c* of the user 20*c* that performs the operation input by gesture, and the information of the 3D model 60*c* and the N 2D images are input to the gesture recognizing unit 141.

The gesture recognizing unit 141 recognizes that the user 20*c* is performing the operation input by gesture on the basis of the input 2D image or the like. For example, the motion of the user 20*c* is detected on the basis of the feature quantity or the like, and it is determined whether or not the motion matches a gesture stored in advance.

In a case in which the motion of the user 20*c* matches the stored gesture, it is recognized that the user 20*c* is performing the operation input by gesture, and the operation input by gesture is received. Note that a method of recognizing the gesture is not limited, and an arbitrary method capable of detecting a motion on the basis of, for example, the 3D model 60*c* or the 2D image may be used.

The determining unit 143 determines content of the gesture on the basis of a recognition result of the gesture recognizing unit 141. In other words, content of the service or the like requested by the user 20*c* is determined. Information such as the determined service content is output to the application 51 as a determination result. Further, the determining unit 143 generates a UI event for giving a notification indicating a situation that the operation input by gesture is being recognized and appropriately outputs the UI event to the replacement control unit 130.

FIG. 14 is a table illustrating an example of the UI events output to the replacement control unit 130. For example, a recognition status of the operation input by gesture such as a gesture recognition start, being recognized, and a recognition end, or the like is output. It is also possible to output the content (recognition result) of the operation input by gesture as the UI event. Note that UI event also includes information about an operation input based on a voice. This point will be described later.

The replacement control unit 130 determines whether or not the replacement condition matches on the basis of the UI event output from the UI determining unit 140. An item of gesture recognition of UI determination is set in the replacement condition information 162 illustrated in FIG. 12 as the replacement condition. In other words, it is determined whether or not the gesture of the user 20*c* is being recognized on the basis of the UI event.

In a case in which it is determined that the gesture of the user 20*c* is being recognized, the human body is detected on the basis of 2D image or the like, and marking and ID assignment are performed on the human body. Then, the mark and the ID of the human body and the replacement information 161 are transmitted to the replacement processing unit 120, and the replacement process 121 (the second generation process) is executed.

As illustrated in FIG. 11, in the replacement target information 163 of the present example, both arms are designated as the replacement target. Further, information of a model indicating a status in which both arms are stretched is stored in the model generation information 164. The replacement process 121 is executed on the basis of the replacement target information 163 and the model generation information 164, and the second virtual model 30c in which both arms are stretched and stands upright is generated.

Of course, a type or the like of gesture to be replaced are not limited, and the replacement process 121 may be executed on any gesture. For example, it is assumed that a gesture in which the user 20c gives a sign using a fingertip is recognized. In this case, for example, a fingertip or a palm of the user 20c may be replaced. Accordingly, it is possible to improve the efficiency of the replacement process 121 since only the part related to the gesture is replaced.

As described above, the replacement control unit 130 selects execution of the second generation process in a case in which the operation input by gesture is received. Then, the second virtual model 30c which does not execute a gesture as the second generation process is generated. Accordingly, it is possible to switch the gesture or the like to other motions. Therefore, for example, it is possible to enjoy the virtual experience without showing a local operation input or the like to other users sharing the virtual space V.

Note that, in the present example, the replacement process 121 is executed at a time point at which the gesture recognizing unit 141 recognizes that the gesture is started. For this reason, a certain amount of delay is likely to occur before the second virtual model 30c in which the gesture is replaced is generated after the user 20c starts the gesture.

In order to avoid the delay of the replacement process 121, for example, the user 20c can give a notification indicating the start of the gesture to the UI determining unit 140 using the button 42 illustrated in FIG. 13. For example, the gesture recognizing unit 141 and the determining unit 143 output the UI event of the gesture recognition start on the basis of the output of the button 42. Accordingly, it is possible to start the replacement process 121 before the gesture recognizing unit 141 actually recognizes the gesture of the user 20c. Further, for example, it is possible to avoid influence of the delay by installing a 3D model buffer or the like capable of holding the 3D model 60c for a certain period of time between the 3D model generation unit 110 and the replacement processing unit 120.

Figure 15:
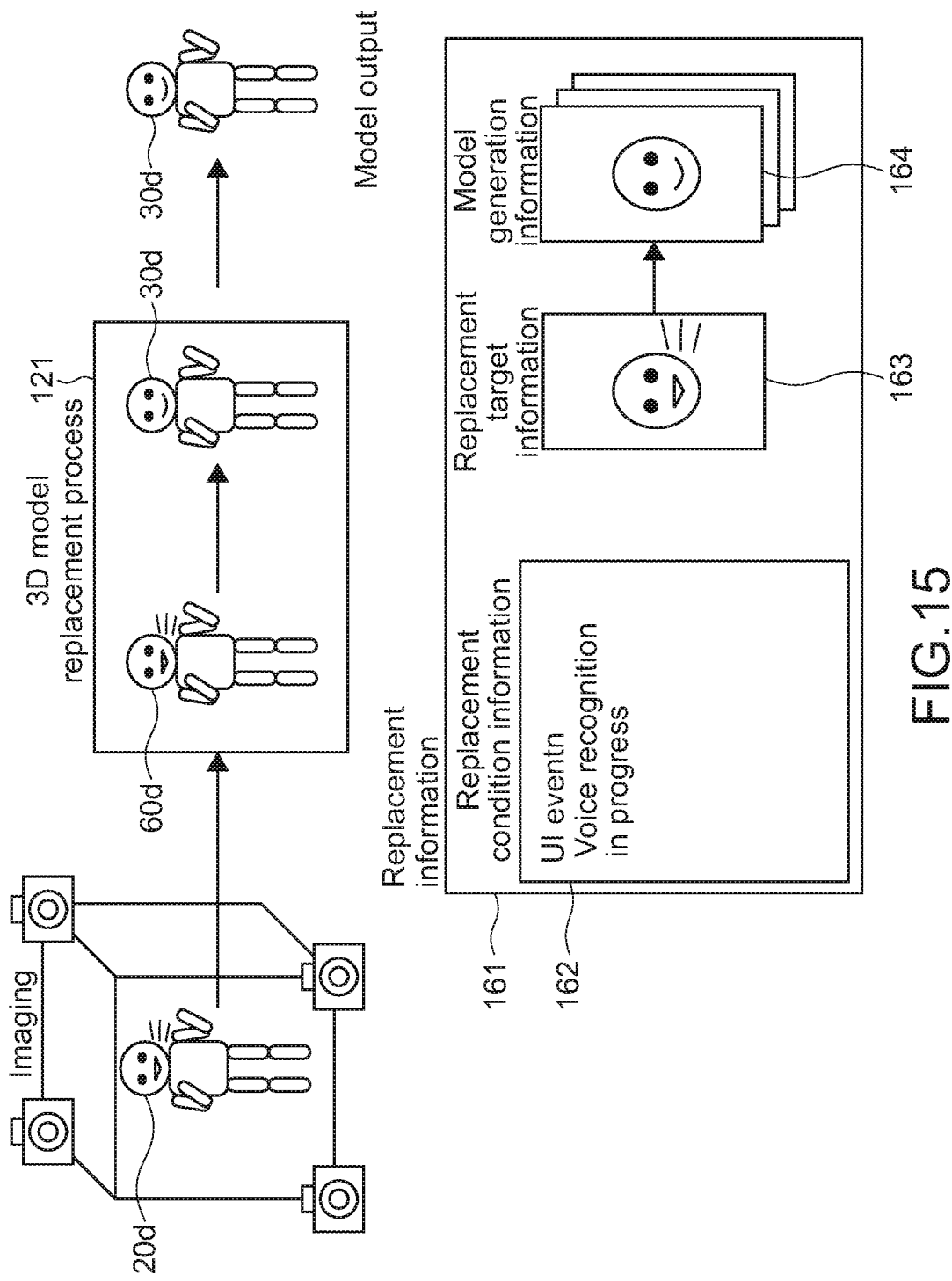
FIG. 15 is a schematic diagram illustrating another example of a second generation process.
Figure 16:
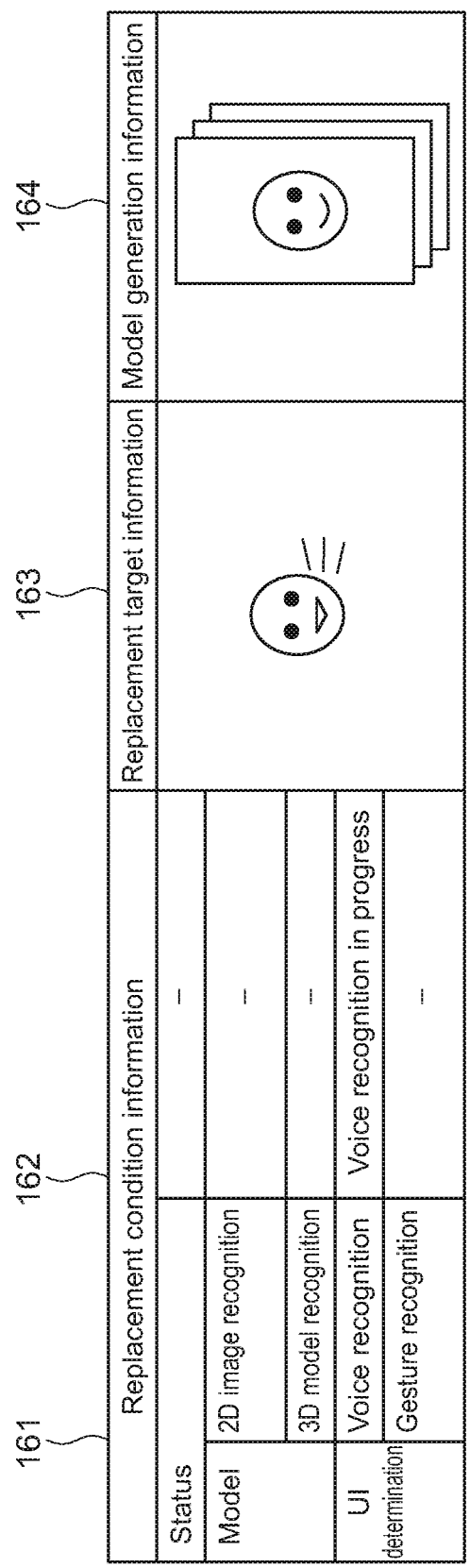
FIG. 16 is a schematic diagram illustrating an example of replacement information referred to in an example illustrated in FIG. 15.

FIG. 15 is a schematic diagram illustrating another example of the second generation process. FIG. 16 is a schematic diagram illustrating an example of replacement information referred to in the present example. In the example illustrated in FIG. 15, the replacement process 121 is executed on a 3D model 60d of a user 20d who performs an operation input by voice, and a second virtual model 30d that does not execute a speaking motion of voice is generated.

The user 20d can perform an operation input by voice. For example, when the user 20d speaks an instruction including a predetermined phrase or, an operation corresponding to the content of the instruction is executed. The 3D model generation unit 110 generates the 3D model 60d of the user 20d that performs a speaking motion. Further, the voice of the user 20d is acquired by the microphone 41, and information of the voice is output to the UI determining unit 140.

The voice recognizing unit 142 of the UI determining unit 140 illustrated in FIG. 13 recognizes whether or not the user 20d is executing the operation input by voice on the basis of the information of the voice of the user 20d. For example, the voice recognizing unit 142 analyzes the information of the voice of the user 20d and acquires a word, a phrase, or the like included in the voice. A method of analyzing the voice of the user 20d is not limited, and any voice recognition technique or the like may be used.

For example, in a case in which a predetermined phrase or the like related to an operation input stored in advance is included in the voice of the user 20d, it is recognized that the user 20d is executing the operation input by voice. In a case in which a predetermined phrase or the like is not included, it is recognized that the user 20d is not executing the operation input by voice.

In a case in which it is recognized that the operation input by voice is being performed, the determining unit 143 determines content of the voice on the basis of the recognition result of the voice recognizing unit 142. In other words, content of a service or the like requested by the user 20d is determined. For example, the determining unit 143 determines content instructed by the user 20d on the basis of a word, a phrase, or the like analyzed by the voice recognizing unit 142. A method of determining content of a voice is not limited, and for example, a text recognition technique using machine learning may be used appropriately.

The information such as the service content determined by the determining unit 143 is output to the application 51 as a determination result. Further, information (see FIG. 14) indicating that the operation input by voice is being recognized is output to the replacement control unit 130 as the UI event.

The replacement control unit 130 determines whether or not the replacement condition matches on the basis of the UI event output from the UI determining unit 140. An item of voice recognition of UI determination is set in the replacement condition information 162 illustrated in FIG. 16 as a replacement condition. It is determined whether or not the voice of the user 20d is being recognized, that is, whether or not the user 20d is executing the operation input by voice on the basis of the UI event.

In a case in which it is determined that the voice of the user 20d is being recognized, the human body is detected on the basis of the 2D image or the like, and marking and ID assignment are performed on the human body. Then, the mark and the ID of the human body and the replacement information 161 are transmitted to the replacement processing unit 120, and the replacement process 121 (the second generation process) is executed.

As illustrated in FIG. 15, in the replacement target information 163 of the present example, a head is designated as the replacement target. Therefore, a motion of the mouth, an expression or the like in the 3D model 60d becomes replacement target. A model of a head with a closed mouth is stored in the model generation information 164. For example, the model of the head with the closed mouth can be generated on the basis of the 2D image or the like in which the status in which the user 20d closes the mouth is photographed in advance. The replacement process 121 is executed on the basis of the replacement target information 163 and the model generation information 164, and the second virtual model 30d in the status in which the mouth is closed is generated.

Note that a case in which communication or the like with other users via voice or the like is possible on the virtual space V is assumed. In this case, for example, the voice of the user 20d may be cut while the user 20d is performing the operation input by voice. For example, when the second virtual model 30d with the closed mouth is displayed, a method of cutting the voice of the user 20d may be used.

As described above, the replacement control unit 130 selects the execution of the second generation process in a case in which the operation input by voice is received. Then, the second model that does not execute the speaking motion of voice is generated as the second generation process. Accordingly, it is possible to switch the speaking motion to other motions. Therefore, for example, it is possible to enjoy the virtual experience without informing other users sharing the virtual space V of the operation input by voice or the like.

Note that, in the present example, the replacement process 121 is executed at a time point at which the voice recognizing unit 142 recognizes that the operation input by voice is started. For this reason, a certain amount of delay is likely to occur before the second virtual model 30d that does not execute the speaking motion is generated. In the present example, the user 20d can give a notification that the operation input by voice is started to the UI determining unit 140 using the button 42 illustrated in FIG. 13. Accordingly, it is possible to start the replacement process 121 before the voice recognizing unit 142 actually recognizes the operation input by voice. Further, for example, it is possible to avoid influence of the delay by installing a 3D model buffer or the like capable of holding the 3D model 60d for a certain period of time between the 3D model generation unit 110 and the replacement processing unit 120.

In a case in which it is possible to communicate with other users via a voice or the like, the first generation process is executed in a case in which it is not determined that it is the operation input by voice. In other words, the first virtual model in which the speaking motion of the user is reproduced without change is generated. Accordingly, highly accurate communication is possible.

At this time, for example, a process of increasing a sampling rate for photographing the head of the user 20d may be performed. Accordingly, it is possible to reproduce the mouth of the user 20d who performs the speaking motion or the like with high reproducibility. As a specific process example, for example, in a case in which the voice of the user 20d is input to the voice recognizing unit 142, the process of increasing the sampling rate for photographing the head of the user 20d is executed. In a case in which content of the voice does not relate to the operation input, the first generation process is executed without change. In a case in which the content of the voice relates to the operation input, the sampling rate is lowered (for example, it is returned to a normal rate) and the second generation process is performed. Accordingly, it is possible to easily realize the natural virtual experience.

FIGS. 11 and 15 illustrate an example of the second generation process in a case in which the operation input by gesture and the operation input by voice are performed. As the operation input, a multimodal operation input in which both gesture and voice are simultaneously used may be performed. In this case, the UI determining unit 140 recognizes both the gesture and the voice of the user 20 and outputs the UI event corresponding to the multimodal operation input (see FIG. 14). Accordingly, for example, it is possible to generate the second virtual model that does not perform a gesture and a speaking motion.

Figure 17:
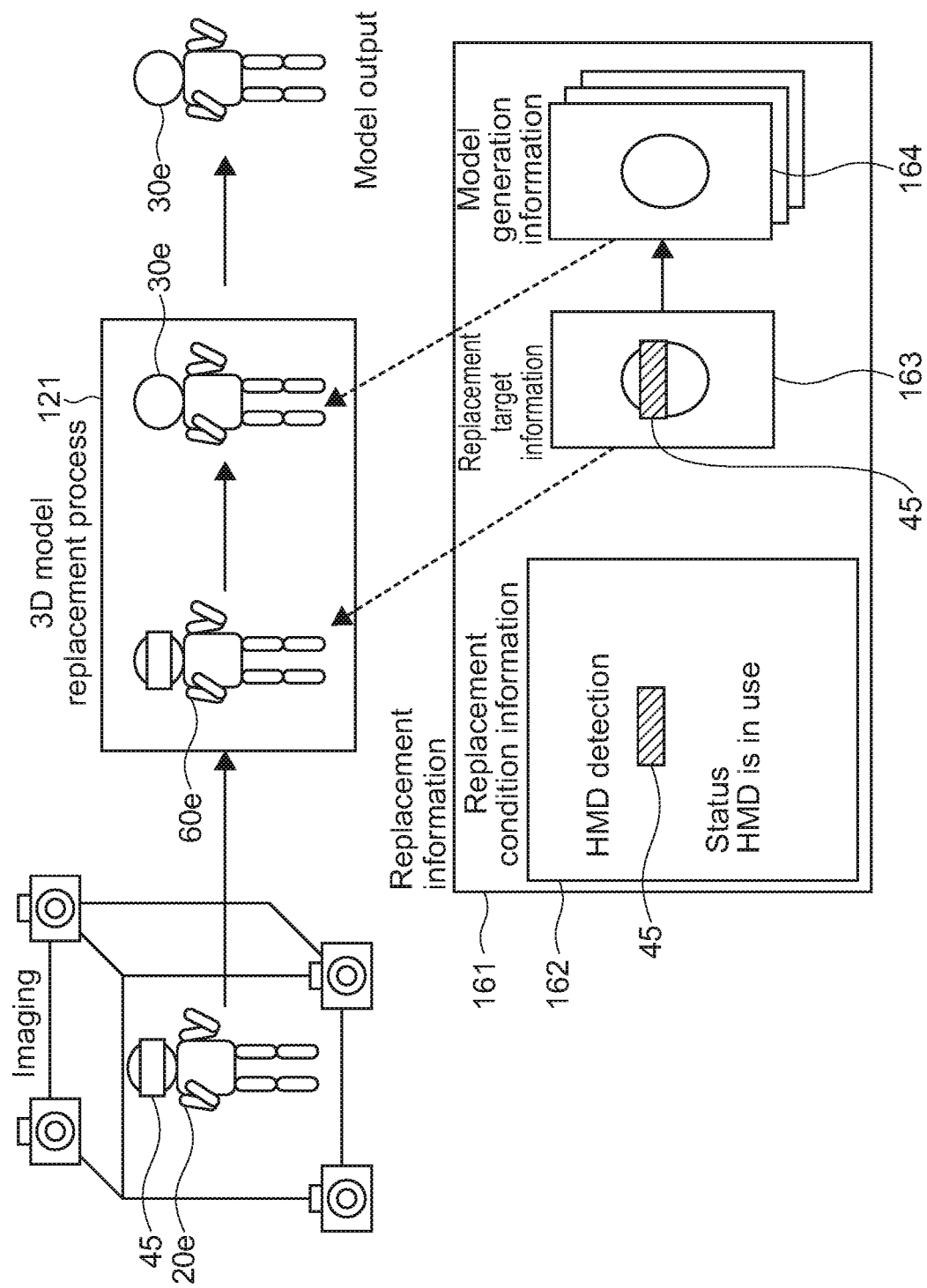
FIG. 17 is a schematic diagram illustrating another example of a second generation process.

FIG. 17 is a schematic diagram illustrating another example of the second generation process. FIG. 18 is a schematic diagram illustrating an example of replacement information referred to in the present example. In the example illustrated in FIG. 18, the replacement process 121 is executed on a 3D model 60e of a user 20e using a head mount display (HMD) 45, and a second virtual model 30e from which the HMD 45 is deleted is generated.

The HMD 45 is a display apparatus used in a state in which it is worn on the head of the user 20e. The HMD is connected to a computer system or the like in which the application 51 is installed, and for example, an image or the like of the virtual space V generated by the application 51 is displayed. By using the HMD 45, for example, it is possible to enjoy the experience as if the user 20e were in the virtual space V. A type or the like of the HMD 45 are not limited, and for example, an immersive display that completely covers the eyes of the user is used. In addition, an HMD or smart glasses including a transmissive display may be used appropriately.

As illustrated in FIG. 17, in a case in which the user 20e wears the HMD 45, it may be difficult to acquire information such as the expression of the user 20e. Therefore, when replacement of the face part of the 3D model 60e wearing the HMD 45 is performed, a parameter (face model parameter) regarding the expression or the like of the user 20e is newly acquired. In the present example, the face model parameter of the user 20e is acquired on the basis of the information from the sensor that reads the expression or the like of the user 20e attached to the inside of the HMD 45.

As a sensor for reading the expression or the like, for example, a camera or the like capable of photographing the eyes, the eyebrows, or the like of the user 20e is installed inside the HMD 45. A type of sensor that reads the expression or the like of the user 20e is not limited, and a sensor that detects a line of sight direction of the user 20e or a sensor that detects a motion of the eyebrows may be used appropriately.

Figure 19:
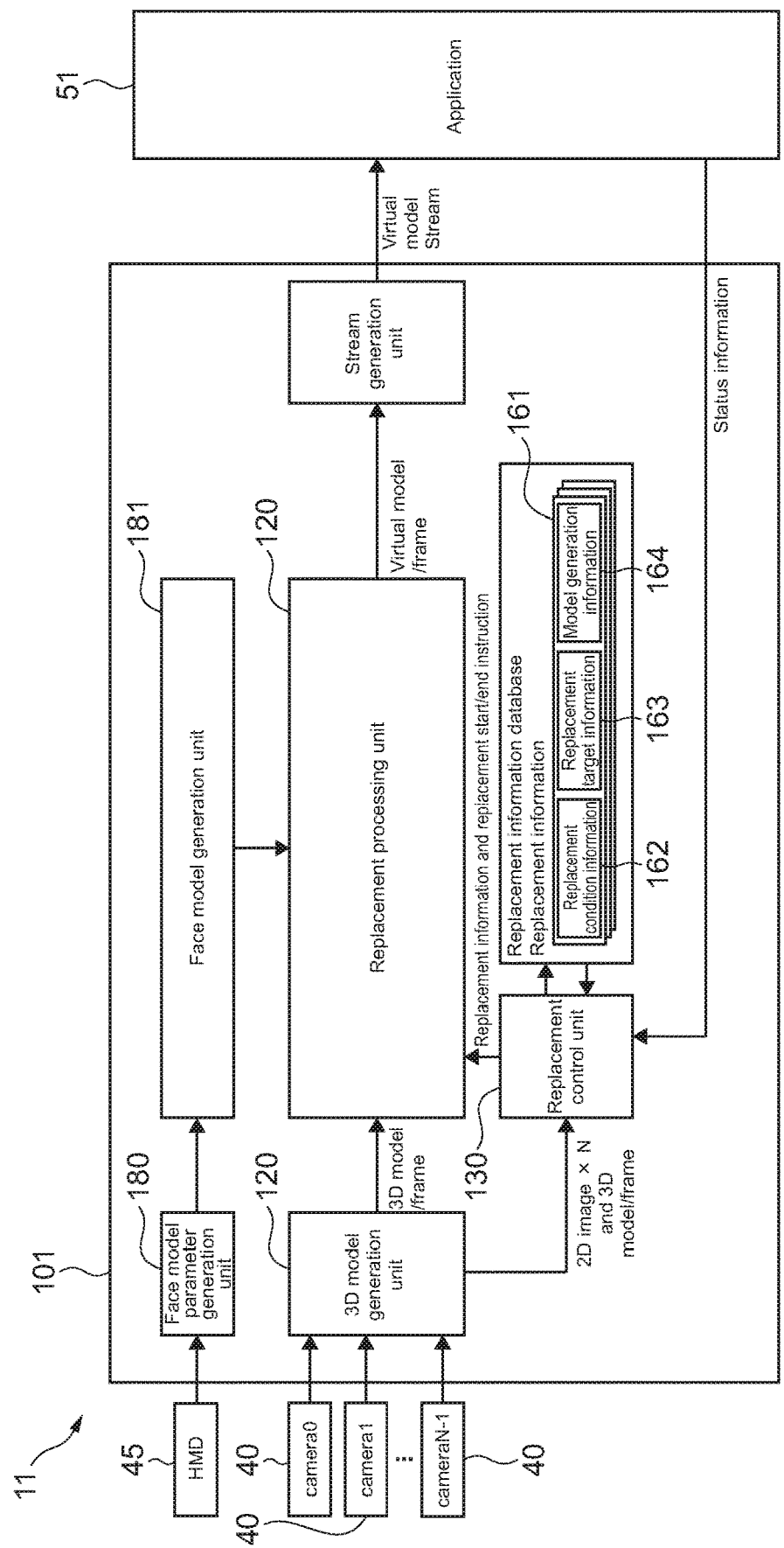
FIG. 19 is a block diagram illustrating a configuration example of a virtual space generation system in a case in which a HMD is used.

FIG. 19 is a block diagram illustrating a configuration example of a virtual space generation system 11 in a case in which the HMD 45 is used. The virtual space generation system 11 includes an HMD 45, a plurality of cameras 40, a model generating apparatus 101, and an application 51. The model generating apparatus 101 includes a face model parameter generation unit 180 and a face model generation unit 181 in addition to the functional blocks illustrated in FIG. 2. Note that, in FIG. 19, the microphone 41, the button 42, the UI determining unit 140, and the generated model buffer 170 illustrated in FIG. 2 are omitted.

The face model parameter generation unit 180 generates the face model parameter of the user 20e on the basis of information from the sensor that reads the expression or the like of the user 20e installed in the HMD 45. For example, a line of sight direction of the user 20e, a shape (contour) of the eye, a motion of the eyebrows, or the like are generated on the basis of an image of the eyes of the user 20e as the face model parameter. A method of generating the face model parameter is not limited. For example, any expression recognition technique that can detect the motion of the eyes, the nose, the mouth, or the like may be used.

The face model generation unit 181 generates the face model of the user 20e on the basis of the face model parameter. For example, a reference face model in which the contour of the face of the user 20e or parts such as the eyes, the nose, the mouth, and the ears are reproduced is generated and stored in advance. The face model generation unit 181 generates the face model of the user on the basis of the face model parameter and the reference face model.

For example, the reference face model of the user 20e is generated on the basis of the 2D image obtained by photographing the face of the user 20e without wearing the HMD 45. Further, a situation in which the user 20e starts using the HMD 45 while using the model generating apparatus 101 is also assumed. In such a case, the reference face model may be generated on the basis of the 3D model of the user 20e generated immediately before the HMD 45 is used. Accordingly, it is possible to generate the face model on the basis of the most recent state of the user 20e.

The face model generation unit 181 generates the face model of the user 20e by deforming the reference face model on the basis of the face model parameter. For example, the reference face model is deformed in accordance with an opening degree of the eye, the motion of the eyebrows, or the like in the face model parameter. Accordingly, the face model that reproduces the expression or the like of the user 20e when the user 20e wears the HMD 45 is generated. A method of deforming the reference face model is not limited, and for example, the deformation or the like of the 3D model using an arbitrary model capable of expressing the expression of the person or the like is appropriately used.

As illustrated in FIG. 17, the 3D model 60e of the user 20e using the HMD 45 is generated. The replacement control unit 130 determines whether or not the status matches on the basis of the replacement condition information 162. As illustrated in FIG. 18, in the present embodiment, if the status information indicating that the HMD 45 is being used is input to the replacement control unit 130, it is determined that the status matches. Then, it is determined whether or not the recognition feature quantity of the HMD 45 matches in the 2D image. In other words, it is determined whether or not the HMD 45 can be recognized.

In a case in which the HMD 45 is recognized, a corresponding part is marked and assigned an ID. Further, the human body is detected, and marking and ID assignment are performed. The mark and the ID of the HMD 45, the mark and the ID of the human body, and the replacement information 161 are transmitted to the replacement processing unit 120. Then, the replacement process 121 (second generation process) is executed.

In the replacement target information 163 of the present example, an HMD 45 and a head are specified. Further, the model generation information 164 stores a method of changing the head serving as the replacement target. For example, an instruction to generate a mode of a head for replacement is stored as the model generation information 164 using the face model of the user 20e generated by the face model generation unit 181.

The replacement processing unit 120 deletes the HMD 45 in the 3D model 60e is deleted on the basis of the replacement target information 163 and the model generation information 164. Further, the head of the 3D model 60e is replaced with the model of the head generated on the basis of the face model of the user 20e. Accordingly, the second virtual model 30e in which the expression or the like of the user 20e is reproduced is generated.

As described above, the second virtual model 30e from which the HMD 45 used by the user 20e is deleted is generated by the second generation process. Accordingly, it is possible to reproduce the expression of the user 20e even in a case in which the HMD 45 or the like is used and to realize smooth communication or the like with other users. Therefore, it is possible to reduce the burden on the user 20e and provide the natural virtual experience.

In addition to the HMD 45, any apparatus attached to the user 20e may be detected, and the replacement process may be executed appropriately. For example, even in a case in which a headphone, an apparatus that reproduces a sensation such as a tactile sense, or the like is installed, it is possible to generate the second virtual model from which these apparatuses are deleted.

Figure 20:
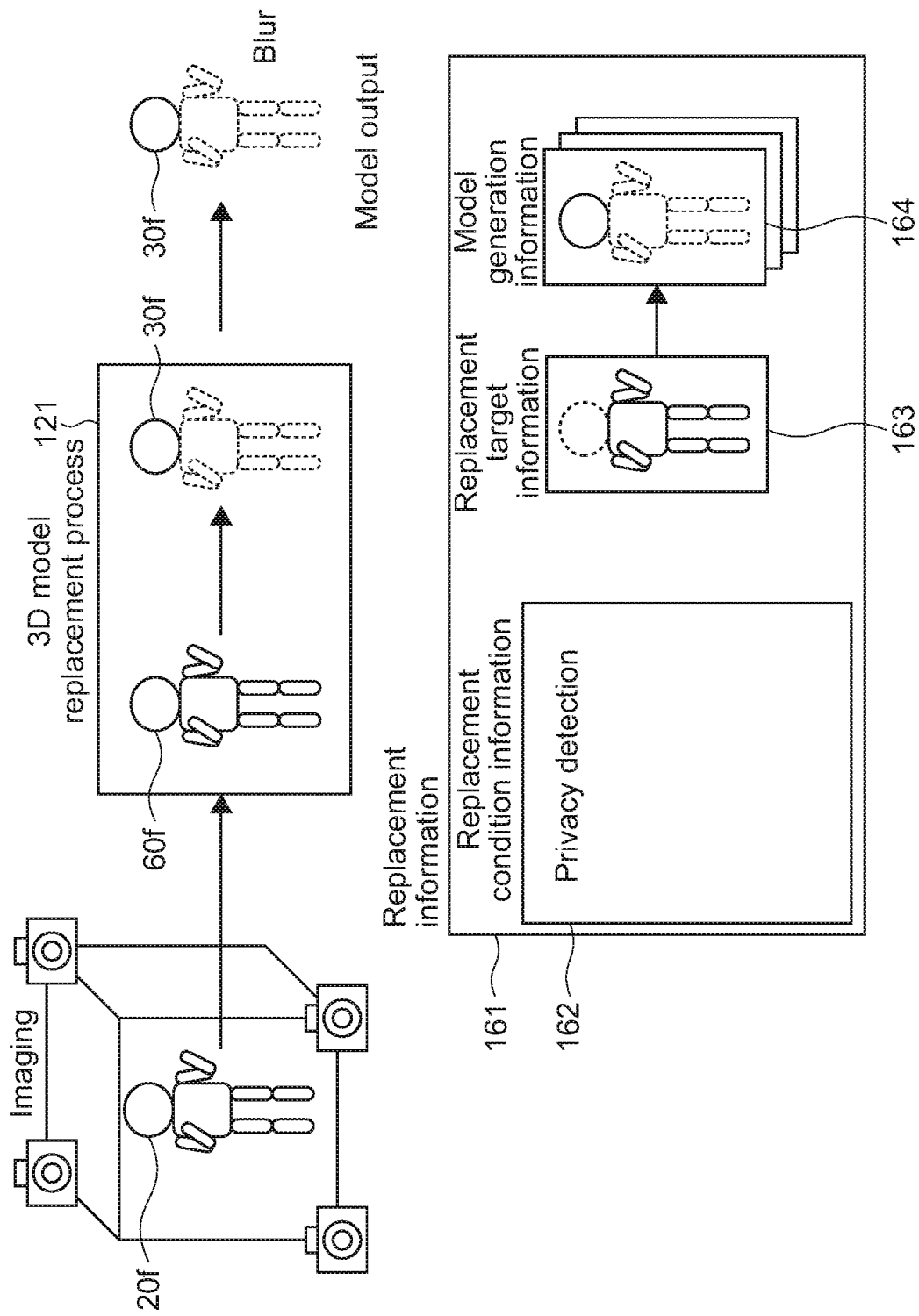
FIG. 20 is a schematic diagram illustrating another example of a second generation process.

FIG. 20 is a schematic diagram illustrating another example of the second generation process. FIG. 21 is a schematic diagram illustrating an example of replacement information referred to in the present example. In the example illustrated in FIG. 20, the replacement process 121 is executed on a 3D model 60f of a user 20f in a status in which privacy protection is required, and a second virtual model 30f modified so that the privacy is protected is generated.

The status in which privacy protection is required is, for example, a status in which the user 20f is changing clothes or is naked. Such a status is detected, for example, by performing image processing for detecting an exposure amount or the like of the skin in the 2D image obtained by photographing the user 20f. Further, a case in which the user 20f inputs a passcode code or the like in the virtual space V or a case in which information related to personal information of the user is photographed corresponds to the status in which the privacy protection is required.

In the present example, a privacy detecting unit (not illustrated) is installed in the model generating apparatus 100 (see FIG. 2). The privacy detecting unit determines whether or not the privacy protection is required on the basis of the 2D image or the 3D model 60f. Then, the privacy detecting unit detects a 2D image or the like obtained by photographing the status in which the privacy protection is required as a privacy image. For example, in a case in which the exposure amount of the skin of the user 20f in the 2D image exceeds a predetermined threshold value, it is determined that the privacy protection is required. Further, a 2D image or the like obtained by photographing the user 20f in the status is detected as the privacy image.

A detection status of the privacy image is output from the privacy detecting unit to the replacement control unit 130. In other words, information related to a detection start, a detection continuation, a detection end, or the like of the privacy image is output. Alternatively, a detected privacy image, information about a part in which the privacy protection is required, or the like may be output.

The replacement control unit 130 determines whether or not the replacement condition is satisfied on the basis of the detection status of the privacy image output from the privacy detecting unit. In the replacement condition information 162 illustrated in FIG. 21, an item regarding the detection status of the privacy image is set as the replacement condition regarding whether or not the user 20f is in the status in which the privacy protection is required. In a case in which the privacy image is detected, the replacement condition is satisfied since it is the status in which the privacy protection is required.

In a case in which it is determined that the replacement condition is satisfied, the replacement control unit 130 detects the human body on the basis of the 2D image or the like, and marking and ID assignment are performed on the human body. Then, the mark and the ID of the human body and the replacement information 161 are transmitted to the replacement processing unit 120, and the replacement process 121 (the second generation process) is executed.

As illustrated in FIG. 20, in the replacement target information 163 of the present example, a part other than the head is specified as the replacement target. In other words, both hands, both legs, and the torso are the replacement targets. Further, a method of changing both hands, both feet, and the torso serving as the replacement targets is stored in the model generation information 164. For example, an instruction to blur and display a part serving as the replacement target is stored as the model generation information. The second virtual model 30f in which the part other than the head of the 3D model 60f is blurred is generated on the basis of the replacement target information 163 and the model generation information 164.

Note that a method of changing the replacement target is not limited. For example, various methods such as a method of putting a mosaic in the part serving as the replacement target, a method of replacing it with a model in a normal status on the basis of a previous image or a 3D model, a method of replacing it with a model prepared in advance, a method of hiding it by displaying (adding) a predetermined object, and a method of simply deleting it may be used.

As described above, the replacement control unit 130 selects execution of the second generation process in a case in which it is determined that the user 20f is in the status in which the privacy protection is required. Then, the second virtual model 30f in which at least a part of the user 20f is modified is generated as the second generation process. Accordingly, it is possible to generate the second virtual model 30f in which the privacy of the user 20f is protected and enjoy the virtual experience with security.

Note that it may be possible to designate a part which is a replacement target or the like. For example, the privacy detecting unit may finely determine and designate parts which are privacy protection targets such as the upper body, the lower body, the chest, and the waist on the basis of the 2D image or the like. In this case, for example, as the replacement target information 163 and the model generation information 164, information indicating that a change such as blurring is performed on the part designated by the privacy detecting unit is stored. Note that it is also possible to apply a mosaic or the like to a T-shirt worn by the user 20f, a calendar shown in the 2D image, or the like in a case in which a photograph of the naked body is placed on it.

The need for the privacy protection may be determined in a manner that depends on a situation of the virtual space V or the like. For example, in the case of a situation in which the virtual model 30f stands in front of an ATM or a door of a bank and inputs a passcode number or the like in the virtual space V, the virtual space V in which numeric keys or the like are blurred may be provided to other users.

FIGS. 22A and 22B are schematic diagrams illustrating another example of replacement information. FIG. 22A is a schematic diagram illustrating the replacement information 161 in which the operation input by gesture is included in the replacement condition. FIG. 22B is a schematic diagram illustrating the replacement information 161 in which the operation input by voice is included in the replacement condition.

For example, the second generation process of applying a mosaic or the like may be performed in a case in which it is changed to a privacy mode for privacy protection on the basis of the operation input by a gesture or a voice of the user 20f, a button, or the like.

In FIG. 22A, the replacement condition is satisfied in a case in which a candidate of the privacy image of the user 20f is being detected, and the change to the privacy mode by the gesture is recognized. Note that the candidate of the privacy image is, for example, an image that does not satisfy a condition satisfied by the privacy image. Further, in FIG. 22B, the replacement condition is satisfied in a case in which the candidate of the privacy image is being detected, and the change to the privacy mode by the voice is recognized.

Accordingly, the user 20f can switch to the privacy mode (the second generation process) explicitly by performing the operation input using a gesture or the like. Therefore, for example, even in a situation in which the privacy detecting unit is unable to be determined that it is the status in which the protect privacy is required, it is possible to sufficiently protect the privacy of the user 20f.

In the examples illustrated in FIGS. 22A and 22B, the detection of the candidate of the privacy image and the privacy mode instruction by the user 20f are conditions for determining the status in which the privacy protection is required.

In a case in which there is a privacy mode instruction by the user 20f, it may be determined that it is the status in which the privacy protection is required regardless of whether or not the privacy image or a candidate thereof is detected. Then, regardless of the exposure amount of the skin or the like, for example, the second generation process of blurring and displaying a part other than the head of the user 20f may be executed. Accordingly, it is possible to realize the privacy protection in which the intention of the user 20f is sufficiently reflected.

It is possible to realize the reliable privacy protection by enabling the transition to the privacy mode by the instruction of the user 20f in addition to the transition to the privacy mode by the detection of the privacy image.

Figure 23:
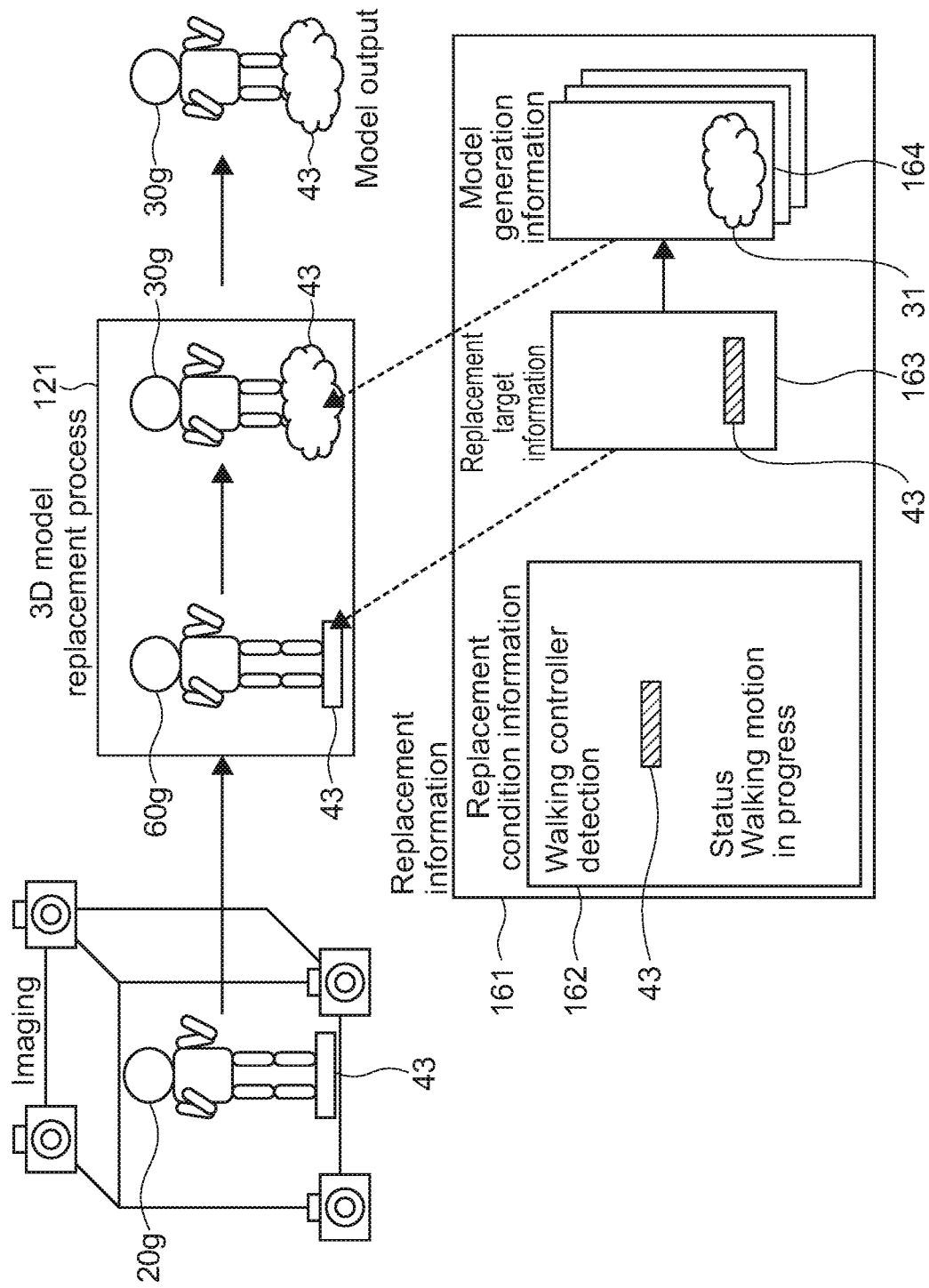
FIG. 23 is a schematic diagram illustrating another example of a second generation process.
Figure 24:
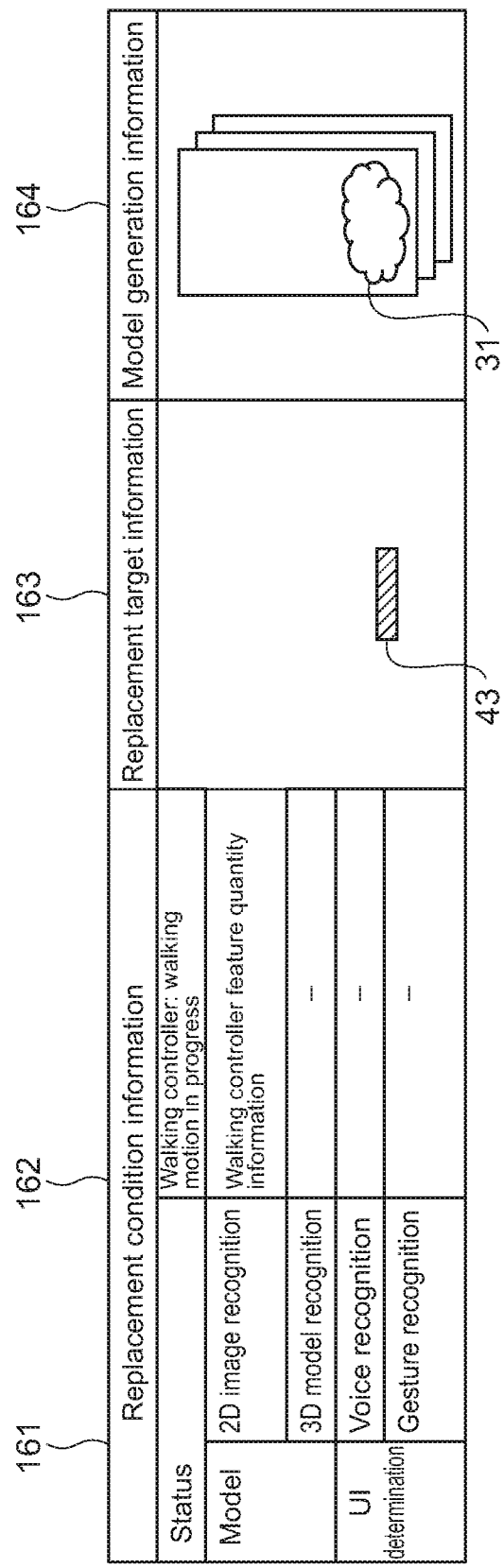
FIG. 24 is a schematic diagram illustrating an example of replacement information referred to in an example illustrated in FIG. 23.

FIG. 23 is a schematic diagram illustrating another example of the second generation process. FIG. 24 is a schematic diagram illustrating an example of replacement information referred to in the present example. In the example illustrated in FIG. 23, the replacement process 121 is executed on a 3D model 60g of a user 20g using the walking controller 43, and a second virtual model 30g in which the walking controller 43 is replaced with another object is generated.

As illustrated in FIG. 23, the user 20g gives an instruction of the walking motion or the like in the virtual space V using the walking controller 43. In the example illustrated in FIG. 4, the second virtual model 30a performing the walking motion in which the walking controller 43 is deleted is generated on the basis of the instruction of the walking motion. In the present example, the walking controller 43 is replaced with another object, and a moving status different from the walking motion is expressed.

It is determined whether or not the status matches on the basis of the replacement condition information 162. In a case in which the status in which the walking motion is being performed in accordance with the instruction from the walking controller 43, then it is determined whether or not the walking controller 43 can be recognized. In the replacement information 161 illustrated in FIG. 24, it is determined whether or not the recognition feature quantity of the walking controller 43 matches on the basis of the 2D image.

In a case in which the walking controller 43 is recognized, a corresponding part on the 3D model 60g is marked and assigned an ID. The marking and the ID of the walking controller 43 and the replacement information 161 are transmitted to the replacement processing unit 120. Then, the replacement process 121 (the second generation process) is executed. Note that the replacement target information 163 does not include information about the human body as illustrated in FIG. 24. Therefore, for example, detection of parts or the like corresponding to the human body on the 3D model 60g is not performed. Of course, information of whether or not the human body is recognized may be included in the replacement condition.

In the replacement target information 163, the walking controller 43 is designated as the replacement target. Further, a cloud-like object 31 is recorded in the model generation information 164. The second virtual model 30g in which the walking controller 43 on the 3D model 60g is replaced with the cloud-like object 31 is generated on the basis of the replacement target information 163 and the model generation information. In this case, for example, replacement is performed such that the cloud-like object 31 is arranged to cover the feet of the 3D model 60g.

For example, a moving motion is expressed instead of the walking motion such that the second virtual model 30g riding the cloud-like object 31 is moved in a moving direction designated by the user 20g. Thus, it is possible to use as a metaphor indicating a predetermined motion or the like in the virtual space V by replacing the walking controller 43 with the cloud-like object 31 or the like. In this case, since it is not necessary to perform the replacement process 121 for the human body or the like, it is possible to express the moving motion or the like efficiently.

A motion or a status expressed by replacing at least a part of the 3D model 60g with another object is not limited. For example, a single-handed controller used by the user 20g may be replaced with a handgun model, a fishing rod, or the like. Further, the two-handed controller may be replaced with a steering wheel of a car or the like.

Further, in a case in which the user 20g performs a predetermined motion, the replacement process 121 or the like corresponding to the motion may be executed. For example, in a case in which the user 20g performs a motion of forming a handgun with a fingertip, it is possible to replace the part with the handgun model. Various variations of the replacement process 121 in which the belongings of the user 20g are with a bowl and chopsticks in a case in which a motion of eating a noodle is performed or the hands of the user are replaced with feathers in a case in which the user 20g performs a motion of flutter the wings by moving both hands may be realized. Accordingly, the user 20g can fully enjoy various virtual experiences.

FIG. 25 is a diagram for describing another example of the second generation process and is a schematic diagram illustrating an example of movement in the virtual space V. In FIG. 25, a space sharing spot S that photographs the user by a plurality of cameras 40 and generates the virtual model 30 of the user is schematically illustrated. The user can experience the virtual space V using the space sharing spot S. For example, if the user enters the space sharing spot S, the virtual model 30 of the user is generated and displayed in the virtual space V set by default in the space sharing spot S.

In the example illustrated in FIG. 25, three space sharing spots S1 to S3 are illustrated. Virtual spaces V1 to V3 that reproduce the Harajuku Takeshita street, the Shibuya center street, and the Ginza central street are set by default in the space sharing spots S1 to S3. Therefore, in a case in which the user starts the virtual experience using the space sharing spot S1, the user experiences the virtual space V1 which reproduces Harajuku Takeshita street.

It is possible to arrange a plurality of virtual spaces V1 to V3 in a static 3D space generated on the basis of an actual map or the like. Further, it is also possible to move to the virtual space V set by default in other shared spots S using one space sharing spot S. For example, it is assumed that the user experiences the virtual space V1 of the Harajuku Takeshita street using the space sharing spot S1. It is possible for the user to move to the virtual space V2 in which the Shibuya center street is reproduced by walking on a street similar to a street from Harajuku Takeshita street to the Shibuya center street in the real space in the virtual space V1.

Further, when such a long distance movement in the virtual space V is performed, it is also possible to designate a destination and move instantaneously (virtual space movement). For example, in a case in which the user experiencing the virtual space V1 of the Harajuku Takeshita street using the space sharing spot S1 designates the Shibuya Center street and inputs an instantaneous movement instruction, switching to the virtual space V2 of the Shibuya center street is instantaneously performed.

Figure 26A:
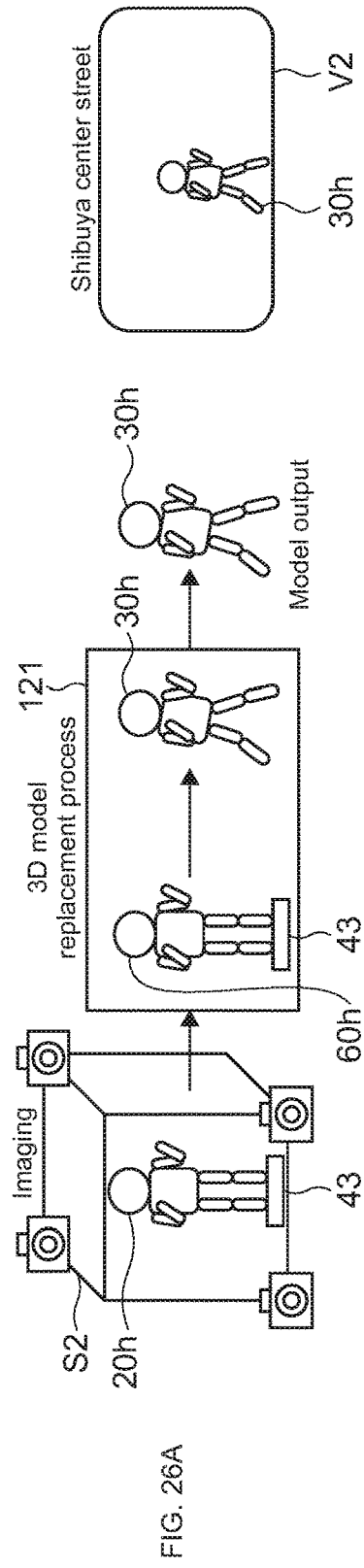
FIGS. 26A and 26B are schematic diagrams illustrating another example of a second generation process.
Figure 26B:
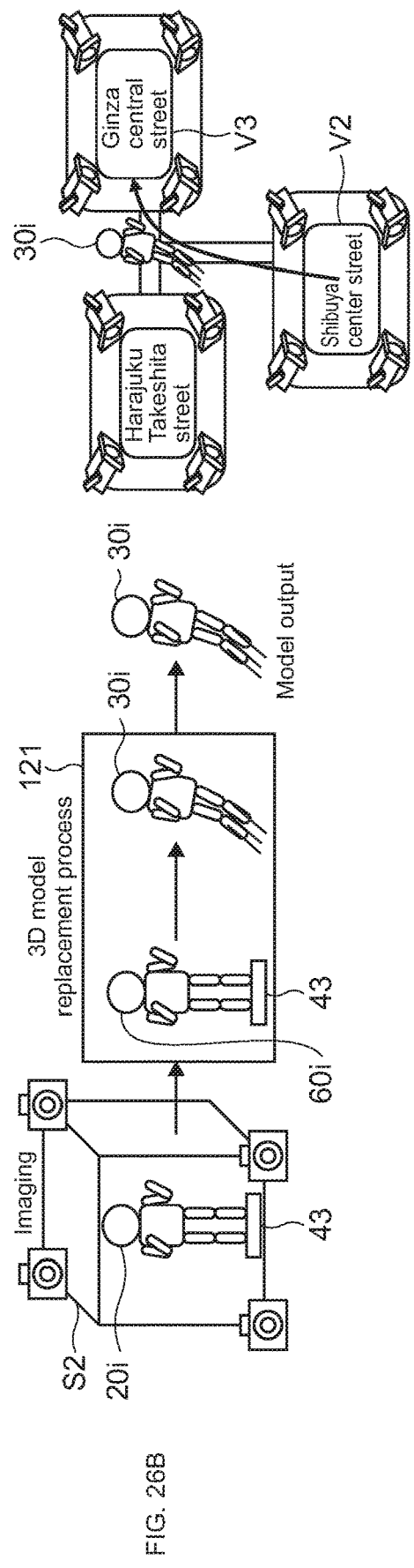

FIG. 26A is a schematic diagram illustrating an example of the second generation process in a case in which the walking motion is instructed. FIG. 26B is a schematic diagram illustrating an example of the second generation process in a case in which the virtual space movement is instructed. FIGS. 27A and 27B are schematic diagrams illustrating examples of replacement information referred to in FIGS. 26A and 26B, respectively.

In FIG. 26A, a user 20h logs in the virtual space V2 from the space sharing spot S2, and the virtual model 30h of the user 20h is displayed in the virtual space V2 which the Shibuya center street is reproduced. The user 20h can output a walking instruction or the like using the walking controller 43.

The replacement control unit 130 determines whether or not the status matches on the basis of the replacement condition information 162 illustrated in FIG. 27A. In a case in which the status in which the walking motion is being performed in accordance with the instruction from the walking controller 43, then it is determined whether or not the walking controller 43 can be recognized. In a case in which the walking controller 43 is recognized, a part on the 3D model 60h corresponding to the walking controller 43 and a part corresponding to the human body are detected, and marking and ID assignment are performed respectively.

The mark and the ID of the walking controller 43, the mark and the ID of the human body, and the replacement information 161 are transmitted to the replacement processing unit 120. Then, the replacement process 121 (the second generation process) is executed, and the second virtual model 30h that performs the walking motion is generated. Accordingly, the user 20h can walk and move in the virtual space V2 via the second virtual model 30h.

In FIG. 26B, a user 20i performs instantaneous virtual space movement from the virtual space V2 in which the Shibuya center street is reproduced to the virtual space V3 in which the Ginza central street is reproduced. For example, the user 20i speaks a phrase indicating movement to the Ginza central street (the virtual section V3) and executes an operation input by voice. At this time, the user 20i performs a predetermined motion such as jumping on the walking controller 43.

Content of the operation input by the voice or the like is determined by the UI determining unit 140, and the UI determination result and the UI event are transmitted to the application 51 and the replacement control unit 130, respectively. Further, the walking controller 43 outputs an instruction of a jump motion to the application 51.

The application 51 determines the status of the user 20i or the like on the basis of the UI determination result and the information from the walking controller 43. In the present example, it is determined that the user 20i requests the virtual space movement. The application 51 generates status information indicating that the virtual space movement is being performed, and transmits the status information to the replacement control unit 130.

The replacement control unit 130 determines whether or not the status and the item of the UI determination match on the basis of the replacement condition information 162 illustrated in FIG. 27B. In a case in which the status indicating that the user 20i requests the virtual space movement, and the instruction of the jump motion is output matches, and the voice recognition result matches predetermined content, it is determined whether or not the walking controller 43 can be recognized.

In a case in which the walking controller 43 is recognized, a corresponding part is marked and assigned an ID. Further, the human body is detected, and marking and ID assignment are performed. The mark and the ID of the walking controller 43, the mark and the ID of the human body, and the replacement information 161 are transmitted to the replacement processing unit 120. Then, the replacement process 121 (the second generation process) is executed.

In the example illustrated in FIG. 27B, the replacement target information 163 designates the walking controller 43 and both hands, both feet, and the torso of the human body as the replacement target. Further, a model that performs a flight motion as a motion of expressing the virtual space movement is stored in the model generation information 164. The replacement processing unit 120 generates the second virtual model 30*i* performing the flight motion in which the walking controller 43 of the 3D model 60*i* is deleted is generated.

In addition to the flight motion, various expressions may be realized as the expressions of the virtual space movement. For example, a model that expresses a deformed pose, an effect, or the like used in an animation or the like may be set as the model generation information 164. Accordingly, it is possible to easily express motions that are difficult to realize in the real space S.

As described above, the replacement control unit 130 determines the output from the walking controller 43 and the determination condition regarding the operation input by voice and selects the execution of the second generation process. Then, the second virtual model 30*i* in which a posture or a motion of the user is changed is generated by the second generation process. Accordingly, it is possible to sufficiently express motions specific to the virtual space V-specific such as a motion of instantaneously moving between the virtual spaces V and provide the virtual experience in which the motion burden on the user 20*i* is reduced.

As described above, in the model generating apparatus according to the present embodiment, the first and second generation processes different from each other can be executed as the generation process for generating the model of the user on the basis of the image of the user. It is possible to provide the user with the natural virtual experience by appropriately switching the executions of the first and second generation processes.

In a case in which the users sharing the virtual space communicate with each other by transmitting their own images, a motion or the like that does not relate to communication with other users such as a gesture for inputting a predetermined instruction may be reproduced in the virtual space. In such a case, there arises a problem in that the behavior of the user (the virtual model) in the virtual space is unnatural, or the behavior that the user does not want to be known is displayed.

In the present embodiment, the replacement control unit 130 controls switching of the executions of the first and second generation processes. In the first generation process, the first virtual model in which the status of the user contained in the image of the user is reproduced is generated. Further, in the second generation process, the second virtual model in which at least some of the statuses of the user included in the image of the user are changed is generated.

As described above, it is possible to switch and display the model (the first virtual model) in which the status of the user being actually photographed is reproduced without change and the model (the second virtual model) in which the status of the user is appropriately changed and reproduced. Therefore, it is possible to replace and display a part of the image of the user who does not want to be temporarily shown to other users such as a gesture associated with a temporary UI operation or a movement operation.

Further, the control of the switching of the executions of the first and second generation processes is performed on the basis of a plurality of replacement conditions corresponding to various situations. Accordingly, it is possible to dynamically perform the replacement process in accordance with a situation at that time. Further, a method of changing at least some of the statuses of the user is stored in association with the replacement condition. Therefore, an appropriate change or the like corresponding to each situation is executed, and it is possible to express the motion of the user more naturally.

Other Embodiments

The present technology is not limited to the embodiment described above, and various other embodiments can be realized.

In the above example, in a case in which the replacement condition is satisfied, switching from the first generation process to the second generation process is performed, and the second virtual model in which the status of the user is changed is generated and displayed. The present technology is not limited thereto, and the second virtual model may be displayed by default, and in a case in which a predetermined restoration condition is satisfied, switching to the first generation process may be performed, and the first virtual model in which the status of the user is reproduced without change may be generated and displayed.

For example, a model in which the left hand of the user is replaced is generated as the default second virtual model. In other words, regardless of what the actual left hand movement of the user is, the left hand moving naturally in accordance with the entire motion or posture of the user is represented in the virtual space. For example, it is natural arm shaking corresponding to the walking/running motions, natural left hand posture corresponding to upright/sitting postures, or the like. Accordingly, the user can perform a local operation including a gesture or the like using the left hand without letting other users to know it.

Various conditions can be considered as the recovery condition. For example, in a case in which a situation requiring a motion using both hands occurs, the restoration condition is satisfied, and switching to the first generation process is performed. Accordingly, the first virtual model in which the motions of the left and right hands are reproduced without change is displayed. Further, the presence or absence of the instruction of the user via a button operation, a voice, a gesture, or the like may be set as the restoration condition. For example, the presence or absence of a predetermined gesture using the left hand which is a default replacement target or the like is considered. Accordingly, it is possible to perform switching to the first virtual model in which the motion of both hands or the like is reflected at a timing desired by the user.

For example, a setting in which switching to the default replacement process (the second generation process) is automatically performed if a predetermined time elapses after switching to the first generation process is performed is also possible. Accordingly, it is possible to perform switching to the dummy left hand again without letting other users to know it. As described above, the user can perform a local operation or the like regardless of how it is shown to other users by setting the second generation process by default.

Note that, in a case in which switching to the second generation process is performed on the basis of the replacement condition, a process of returning to the first generation process may be performed appropriately after a predetermined time elapses.

In a case in which a plurality of replacement conditions is satisfied at the same time, the replacement process may be executed by giving a priority to a condition in which wider replacement is performed. For example, in the condition for replacing both feet and the condition for replacing both feet and both hands, a priority may be given to the latter. Accordingly, it is possible to prevent an unnatural virtual model from being displayed as a plurality of replacements is performed simultaneously.

In the above-described embodiment, the first generation process of generating the first virtual model in which the status of user or the like is reproduced without change and the second generation process of generating the second virtual model in which at least some of the statuses of the user or the like are changed are switched appropriately. The present technology is not limited thereto, and any process may be executed as long as processes different from each other are executed as the first and second generation processes.

For example, as the first generation process, a first replacement process is executed on the 3D model such as the user, and the first virtual model is generated. Then, as the second generation process, the second replacement process different from the first replacement process is executed on the 3D model such as the user, and the second virtual model is generated. In other words, different replacement processes may be executed as the first and second generation processes. For example, the first generation process (the first replacement process) is considered to be the object change process, and the second generation process (the second replacement process) considered to be the human body change process, but, of course, the present technology it not limited thereto.

Further, three or more different generation processes may be executed switchably. For example, the first to third generation processes, the first to fourth generation processes, or the like may be executed switchably in accordance with a condition or the like.

As illustrated in FIG. 2 and the like, in the above embodiment, the 3D model generation unit 110, the replacement processing unit 120, and the replacement control unit 130 cooperate to realize the generation unit. The replacement control unit 130 also functions as the generation control unit. The present technology is not limited to this configuration, and for example, a block in which the functions of the 3D model generation unit 110, the replacement processing unit 120, and the replacement control unit 130 are integrated may be configured. Alternatively, the functions of these blocks may be divided arbitrarily and assigned to a plurality of blocks. For example, the generation unit may be realized by a block in which the replacement processing unit 120 and the replacement control unit 130 are integrated and the 3D model generation unit 110. In addition, an arbitrary configuration is possible.

In the above example, the process of generating the model to be displayed in the virtual space expressing a virtual reality (VR) or the like is performed. For example, the present technology is applicable even in a case in which a model is displayed in a space expressed by augmented reality (AR) or mixed reality (MR).

A case in which the information processing method according to the present technology is executed by a computer such as a PC operated by the user has been described above. However, the information processing method and the program according to the present technology may be executed by another computer capable of communicating with the computer operated by the user via a network or the like. Further, the computer operated by the user may be linked with another computer to construct a simulation system according to the present technology.

In other words, the information processing method and the program according to the present technology can be executed not only in a computer system constituted by a single computer but also in a computer system in which a plurality of computers operates in conjunction with one another. Note that, in the present disclosure, the system refers to an aggregate of a plurality of components (apparatuses, modules (parts), or the like) regardless of whether or not all components are accommodated in the same housing. Therefore, both a plurality of apparatuses which is accommodated in separate housings and connected via a network and a single apparatus in which a plurality of modules is accommodated in one housing are systems.

Execution of the information processing method and the program according to the present technology by the computer system includes, for example, a case in which the first generation process, the second generation process, control of switching of the execution of each generation process, or the like is executed by a single computer and a case in which the respective processes are performed by different computers. Further, execution of each process by a predetermined computer includes causing other computers to execute some or all of processes and acquiring a result thereof.

In other words, the information processing method and the program according to the present technology can be applied to a cloud computing configuration in which one function is shared and processed by a plurality of apparatuses via a network.

Among the feature parts according to the present technology described above, at least two feature parts may be combined. In other words, various feature parts described in the respective embodiments may be combined arbitrarily without distinction of each embodiment. Further, the various effects described above are merely examples and are not limited, and other effects may be included.

Note that the present technology can also employ the following configurations.

(1) An information processing apparatus, including:

an acquisition unit that acquires an image of a target object;

a generation unit that is able to execute each of a first generation process and a second generation process different from the first generation process as a generation process of generating a model of the target object on the basis of the acquired image of the target object; and a generation control unit that controls switching of execution of the first generation process and execution of the second generation process by the generation unit.

(2) The information processing apparatus according to (1), in which the first generation process generates a first model in which the target object is reproduced with first reproducibility, and the second generation process generates a second model in which the target object is reproduced with second reproducibility lower than the first reproducibility.

(3) The information processing apparatus according to (2), in which the first generation process generates the first model in which a status of the target object included in an image of the target object is reproduced, and the second generation process generates the second model in which at least some of statuses of the target object included in the image of the target object are changed.

(4) The information processing apparatus according to (2) or (3), in which the second generation process generates the second model in which at least a part of the target object is replaced or deleted.

(5) The information processing apparatus according to (3) or (4), in which the target object includes a person and an object used by the person.

(6) The information processing apparatus according to (5), in which the second generation process generates the second model in which at least one status of an expression, a posture, and a motion of the person is changed.

(7) The information processing apparatus according to (5) or (6), in which the second generation process generates the second model in which the object used by the person is replaced or deleted.

(8) The information processing apparatus according to any one of (2) to (7), in which the generation unit generates the first and second models in which transition statuses for switching to the first and second models are respectively expressed when the switching of the executions of the first and second generation processes is performed.

(9) The information processing apparatus according to any one of (5) to (8), in which the generation control unit controls the switching of the execution of the first generation process and the execution of the second generation by the generation unit on the basis of determination information including a determination condition of whether or not at least some of the statuses of the target object are changed.

(10) The information processing apparatus according to (9), in which the determination condition includes a condition regarding at least one of an output from a controller used by the person, an image of the person, or a voice of the person.

(11) The information processing apparatus according to any one of (3) to (10), in which the generation control unit selects the execution of the second generation process in a case in which an instruction of a predetermined motion is input, and the generation unit generates the second model that performs the predetermined motion as the second generation process.

(12) The information processing apparatus according to (11), in which the generation unit generates the second model that executes a motion of transitioning to the predetermined motion as the second generation process.

(13) The information processing apparatus according to any one of (9) to (12), in which the determination condition includes a condition regarding at least one of an operation input by a gesture of the person or an operation input by a voice.

(14) The information processing apparatus according to (13), in which the generation control unit selects the execution of the second generation process in a case in which the operation input by the gesture and the operation input by the voice are received, and the generation unit generates the second model that does not execute the gesture and a speaking motion of the voice as the second generation process.

(15) The information processing apparatus according to any one of (9) to (14), in which the determination condition includes a condition of whether or not the person is in a status in which privacy protection is required.

(16) The information processing apparatus according to (15), in which the generation control unit selects the execution of the second generation process in a case in which it is determined that the person is in the status in which privacy protection is required, and the generation unit generates the second model in which at least a part of the person is changed as the second generation process.

(17) The information processing apparatus according to any one of (9) to (16), in which the determination information includes a method of changing at least some of the statuses of the target object associated with the determination condition, and the generation unit executes the second generation process on the basis of the determination information.

(18) The information processing apparatus according to (17), in which the determination information includes specifying information specifying a part which is a change target of the target object and a method of changing the specified part which is the change target.

REFERENCE SIGNS LIST

V, V1 to V3 virtual space
10, 11 virtual space generation system
20, 20a to 20i user
30 virtual model
30a to 30i second virtual model
40 camera
41 microphone
43 walking controller
44 handheld controller
45 HMD
50 virtual space generating apparatus
51 application
60a to 60i 3D model
100, 101 model generating apparatus
110 3D model generation unit
120 replacement processing unit
121 replacement process
130 replacement control unit
140 UI determining unit
141 gesture recognizing unit
142 voice recognizing unit
143 determining unit
160 replacement information DB
161 replacement information
162 replacement condition information
163 replacement target information
164 model generation information

The invention claimed is:

1. An information processing apparatus, comprising:
a processor configured to:
acquire an image of a target object;
execute one of a first generation process or a second generation process, different from the first generation process, as a generation process for generation of a model of the target object, wherein the generation of the model is based on the acquired image of the target object;

control a switch between the execution of the first generation process to generate a first model of the target object and the execution of the second generation process to generate a second model of the target object, wherein the switch is controlled based on a determination condition indicating whether at least one status of a plurality of statuses of the target object is changed;

determine a plurality of replacement conditions corresponding to the plurality of statuses of the target object in a case where the plurality of statuses of the target object are changed; and execute a replacement process that prioritizes a replacement condition among the plurality of replacement conditions, wherein the replacement condition is a condition in which a greater number of parts of the target object are replaced by the replacement process.

2. The information processing apparatus according to claim 1, wherein the processor is further configured to:
generate the first model in which the target object is reproduced with first reproducibility; and
generate the second model in which the target object is reproduced with second reproducibility lower than the first reproducibility.

3. The information processing apparatus according to claim 2, wherein the processor is further configured to:
generate the first model in which a status of the target object included in the image of the target object is reproduced; and
generate the second model in which the at least one status of the plurality of statuses of the target object included in the image of the target object are changed.

4. The information processing apparatus according to claim 3, wherein the target object includes a person and an object used by the person.

5. The information processing apparatus according to claim 4, wherein the processor is further configured to generate the second model based on the second generation process in which the at least one status of the plurality of statuses that includes an expression, a posture, or a motion of the person is changed.

6. The information processing apparatus according to claim 4, wherein the processor is further configured to generate the second model based on the second generation process in which the object used by the person is one of replaced or deleted.

7. The information processing apparatus according to claim 4, wherein the determination condition further includes at least one of an output from a controller used by the person, an image of the person, or a voice of the person.

8. The information processing apparatus according to claim 4, wherein the determination condition further includes at least one of an operation input by a gesture of the person or an operation input by a voice.

9. The information processing apparatus according to claim 8, wherein the processor is further configured to:
select the execution of the second generation process in a case in which the operation input by the gesture and the operation input by the voice are received; and
generate the second model that does not execute the gesture and a speaking motion of the voice based on the second generation process.

10. The information processing apparatus according to claim 4, wherein the determination condition further includes a condition of whether or not the person is in a status in which privacy protection is required.

11. The information processing apparatus according to claim 10, wherein the processor is further configured to:
select the execution of the second generation process in a case where the person is in the status in which the privacy protection is required; and
generate the second model in which at least a part of the person is changed.

12. The information processing apparatus according to claim 3, wherein the processor is further configured to:
select the execution of the second generation process in a case in which an instruction of a determined motion is input; and
generate the second model that executes the determined motion based on the second generation process.

13. The information processing apparatus according to claim 12, wherein the processor is further configured to generate the second model based on the second generation process that executes a motion transition to the determined motion.

14. The information processing apparatus according to claim 2, wherein the processor is further configured to generate the second model in which at least a part of the target object is one of replaced or deleted.

15. The information processing apparatus according to claim 2, wherein the processor is further configured to generate the first model and the second model in which transition statuses to switch to the first model and the second model are respectively expressed at a time of the switch of the execution of the first generation process and the execution of the second generation process.

16. The information processing apparatus according to claim 1, wherein
the switch is further based on a determination information that includes a method of changing the at least one status of the plurality of statuses of the target object associated with the determination condition, and
the processor is further configured to execute the second generation process based on the determination information.

17. The information processing apparatus according to claim 16, wherein the determination information further includes:
specifying information that indicates a determined part which is a change target of the target object, and
a method of changing the determined part which is the change target.

18. The information processing apparatus according to claim 17, wherein the specifying information that indicates the determined part of the target object includes a mark and an identifier associated with the determined part.

19. An information processing method, comprising:
in a computer system:
acquiring an image of a target object;
executing one of a first generation process or a second generation process, different from the first generation process, as a generation process of generating a model of the target object, wherein the generation of the model is based on the acquired image of the target object;
controlling a switch between the execution of the first generation process to generate a first model of the target object and the execution of the second generation process to generate a second model of the target object, wherein the switch is controlled based on a determination condition indicating whether at least one status of a plurality of statuses of the target object is changed;

determining a plurality of replacement conditions corresponding to the plurality of statuses of the target object in a case where the plurality of statuses of the target object are changed; and executing a replacement process that prioritizes a replacement condition among the plurality of replacement conditions, wherein the replacement condition is a condition in which a greater number of parts of the target object are replaced by the replacement process.

20. A non-transitory computer-readable medium having stored thereon, computer-executable instructions which, when executed by a processor, cause the processor to execute operations, the operations comprising:

acquiring an image of a target object;

executing one of a first generation process or a second generation process, different from the first generation process, as a generation process of generating a model of the target object, wherein the generation of the model is based on the acquired image of the target object;

controlling a switch between the execution of the first generation process to generate a first model of the target object and the execution of the second generation process to generate a second model of the target object, wherein the switch is controlled based on a determination condition indicating whether at least one status of a plurality of statuses of the target object is changed;

determining a plurality of replacement conditions corresponding to the plurality of statuses of the target object in a case where the plurality of statuses of the target object are changed; and executing a replacement process that prioritizes a replacement condition among the plurality of replacement conditions, wherein the replacement condition is a condition in which a greater number of parts of the target object are replaced by the replacement process.

* * * * *